United States Patent [19]

Nishioka et al.

[11] Patent Number: 5,390,293
[45] Date of Patent: Feb. 14, 1995

[54] INFORMATION PROCESSING EQUIPMENT CAPABLE OF MULTICOLOR DISPLAY

[75] Inventors: Kiyokazu Nishioka, Odawara; Hideki Kamimaki; Tsutomu Furuhashi, both of Yokohama; Kohji Takahashi, Mobara; Bunichi Fujimaki, Komaki; Koichi Isaji, Nagoya, all of Japan

[73] Assignee: Hitachi, Ltd., Tokyo, Japan

[21] Appl. No.: 107,181

[22] Filed: Aug. 17, 1993

[30] Foreign Application Priority Data

Aug. 19, 1992 [JP] Japan .................. 4-220419

[51] Int. Cl.$^6$ ............................................. G06F 15/00
[52] U.S. Cl. ......................................................... 395/131
[58] Field of Search ............... 395/131, 129; 345/199, 345/153, 154, 155; 358/64, 76, 80

[56] References Cited

U.S. PATENT DOCUMENTS

| | | | |
|---|---|---|---|
| 4,763,283 | 8/1988 | Coutrot ................... | 364/526 |
| 5,025,249 | 6/1991 | Seiler et al. ............. | 340/721 |
| 5,319,750 | 6/1994 | Matsuo et al. .......... | 395/166 |

FOREIGN PATENT DOCUMENTS 3-27420 2/1991 Japan .

*Primary Examiner*—Phu K. Nguyen
*Attorney, Agent, or Firm*—Kenyon & Kenyon

[57] ABSTRACT

An information processing equipment capable of multicolor display, comprising a CPU; a display memory which stores display information therein; a display unit which displays the display information in multiple colors selected from a predetermined number of colors to-be-developed; a display control circuit which controls transfer of information between the CPU and the display memory, and which regularly reads out the display information stored in the display memory and then sends the read-out display information to the display unit; a mode selector which selects one of at least two modes consisting of a first mode and a second mode, and which produces selection information, wherein the first mode causes the display unit to develop a smaller number of multiple colors and to operate at a lower frequency, while the second mode causes the display unit to develop a large number of multiple colors and to operate at a higher frequency; a clock signal generator which generates a plurality of clock signals of unequal frequencies; a clock selector circuit which receives the selection information to select the clock signal of the frequency corresponding to the mode indicated by the selection information, from among the plurality of clock signals delivered from the clock signal generator, and which delivers the selected clock signal to, at least, the display control circuit; and a maximum-number-of-colors selector which is provided in, for example, the display unit, and which receives the selection information to control the number of colors to-be-developed that are to be displayed by the display unit, to the number corresponding to the mode indicated by the selection information.

22 Claims, 28 Drawing Sheets

FIG. 9

| TONE LEVEL | DSP DATA 61 | | | | RANDOM SIG LINE 65 | FRC DSP DATA 71 | | |
|---|---|---|---|---|---|---|---|---|
| | R3 | R2 | R1 | R0 | | FR2 | FR1 | FR0 |
| 15 | 1 | 1 | 1 | 1 | x | 1 | 1 | 1 |
| 14 | 1 | 1 | 1 | 0 | 1 | 1 | 1 | 1 |
| | | | | | 0 | 1 | 1 | 0 |
| 13 | 1 | 1 | 0 | 1 | x | 1 | 1 | 0 |
| 12 | 1 | 1 | 0 | 0 | 1 | 1 | 1 | 0 |
| | | | | | 0 | 1 | 0 | 1 |
| 11 | 1 | 0 | 1 | 1 | x | 1 | 0 | 1 |
| 10 | 1 | 0 | 1 | 0 | 1 | 1 | 0 | 1 |
| | | | | | 0 | 1 | 0 | 0 |
| 9 | 1 | 0 | 0 | 1 | x | 1 | 0 | 0 |
| 8 | 1 | 0 | 0 | 0 | 1 | 1 | 0 | 0 |
| | | | | | 0 | 0 | 1 | 1 |
| 7 | 0 | 1 | 1 | 1 | x | 0 | 1 | 1 |
| 6 | 0 | 1 | 1 | 0 | 1 | 0 | 1 | 1 |
| | | | | | 0 | 0 | 1 | 0 |
| 5 | 0 | 1 | 0 | 1 | x | 0 | 1 | 0 |
| 4 | 0 | 1 | 0 | 0 | 1 | 0 | 1 | 0 |
| | | | | | 0 | 0 | 0 | 1 |
| 3 | 0 | 0 | 1 | 1 | x | 0 | 0 | 1 |
| 2 | 0 | 0 | 1 | 0 | 1 | 0 | 1 | 0 |
| | | | | | 0 | 0 | 0 | 0 |
| 1 | 0 | 0 | 0 | 1 | 1 | 0 | 0 | 1 |
| | | | | | 0 | 0 | 0 | 0 |
| 0 | 0 | 0 | 0 | 0 | x | 0 | 0 | 0 |

FIG. 13

| TONE LEVEL | 4096-CLR DSP DATA 102 | | | | 512-CLR DSP DATA 104 | | | |
|---|---|---|---|---|---|---|---|---|
| | R3 | R2 | R1 | R0 | FR3 | FR2 | FR1 | FR0 |
| 15 | 1 | 1 | 1 | 1 | 1 | 1 | 1 | 1 |
| 14 | 1 | 1 | 1 | 0 | 1 | 1 | 1 | 1 |
| 13 | 1 | 1 | 0 | 1 | 1 | 1 | 0 | 1 |
| 12 | 1 | 1 | 0 | 0 | 1 | 1 | 0 | 1 |
| 11 | 1 | 0 | 1 | 1 | 1 | 0 | 1 | 1 |
| 10 | 1 | 0 | 1 | 0 | 1 | 0 | 1 | 1 |
| 9 | 1 | 0 | 0 | 1 | 1 | 0 | 0 | 1 |
| 8 | 1 | 0 | 0 | 0 | 1 | 0 | 0 | 1 |
| 7 | 0 | 1 | 1 | 1 | 0 | 1 | 1 | 1 |
| 6 | 0 | 1 | 1 | 0 | 0 | 1 | 1 | 1 |
| 5 | 0 | 1 | 0 | 1 | 0 | 1 | 0 | 1 |
| 4 | 0 | 1 | 0 | 0 | 0 | 1 | 0 | 1 |
| 3 | 0 | 0 | 1 | 1 | 0 | 0 | 1 | 1 |
| 2 | 0 | 0 | 1 | 0 | 0 | 0 | 1 | 1 |
| 1 | 0 | 0 | 0 | 1 | 0 | 0 | 0 | 1 |
| 0 | 0 | 0 | 0 | 0 | 0 | 0 | 0 | 1 |

INFORMATION PROCESSING EQUIPMENT CAPABLE OF MULTICOLOR DISPLAY

BACKGROUND OF THE INVENTION

1. Field of the Invention

The present invention relates to an information processing equipment having a display unit, for example, a workstation or a personal computer. More particularly, it relates to an information processing equipment which has a display unit capable of multicolor display and which can select the number of colors to-be-displayed and the operating frequency of the display unit.

2. Description of the Related Art

In recent years, information processing equipment such as workstations and personal computers have become remarkably reduced in size. As a result, they tend to be used in a variety of aspects. They can be broadly classified into three types; the conventional desktop type, the laptop type which can reduce the space needed for installation, and the so-called notebook type which is small in size and is excellent in portability. Among thede types, the information processing equipment of the notebook type should desirably be operable for a long time even though it has a light weight for realizing the portability. Accordingly, an important problem is how to efficiently utilize electric power which can be charged in the built-in battery of the notebook type equipment. In order to solve this problem, various techniques have been contrived. One of them is disclosed in the official gazette of Japanese Patent Application Laid-open No. 27420/1991 entitled "PERSONAL COMPUTER".

With the proposed personal computer, when an input device such as keyboard has not been operated at all for a predetermined time period, the supply of electric power from a power source circuit to a display unit can be stopped. That is, in the absence of keying for the predetermined time period, it is decided that the personal computer is in an idle state in which it is not used or operated by the user thereof, and the display unit of comparatively high power dissipation has its power source turned OFF. Thus, wasteful power consumption is prevented.

When, in this manner, the superfluous power dissipation is avoided on the basis of the detection of the idle state, the operable or serviceable time period of the personal computer with the battery can be prolonged.

Since, however, the frequence of the idle state is low in a data input job or a document preparation job extending over a long time, the operation of saving the power dissipation is not effectively performed with the technique which utilizes the idle state as explained above. Therefore, it will be sometimes impossible to secure a sufficient operable time period. It is accordingly important to secure a longer operable time period even in a state in which the user is continually using or operating such an information processing equipment.

SUMMARY OF THE INVENTION

An object of the present invention is to provide an information processing equipment in which a display unit capable of multicolor display can be operated for the multicolor display by selecting the number of colors to-be-displayed and the operating frequency of the display unit.

Another object of the present invention is to provide an information processing equipment which can reduce power dissipation in the used or operated state thereof so as to extend the battery operable time period thereof.

A certain display unit adopts a technique which can increase the number of colors to-be-developed while ensuring an image quality, by raising the scanning frequency of the display screen of the display unit. In order to accomplish the aforementioned objects, in an information processing equipment having such a display unit, the present invention makes the setting of the number of colors to-be-developed and the scanning frequency variable.

In one aspect of performance of the present invention, there is provided an information processing equipment capable of multicolor display, comprising a CPU (central processing unit); a display memory which stores display information therein; a display unit which displays the display information in multiple colors within a predetermined number of colors to-be-developed; a display control circuit which controls transfer of information between the CPU and the display memory, and which regularly reads out the display information stored in the display memory and then sends the read-out display information to the display unit; a mode selector which selects one of at least two modes consisting of a first mode and a second mode, and which produces selection information, the first mode causing the display unit to develop a smaller number of the multiple colors and to operate at a lower frequency, and the second mode causing the display unit to develop a large number of the multiple colors and to operate at a higher frequency; a clock signal generator which generates a plurality of clock signals of unequal frequencies; a clock selector circuit which receives the selection information and selects the clock signal of the frequency corresponding to the mode indicated by the selection information, from among the plurality of clock signals delivered from the clock signal generator, and which delivers the selected clock signal to, at least, the display control circuit; and number-of-colors control means for receiving the selection information to control the number of colors to-be-developed which are to be displayed by the display unit, to the number corresponding to the mode indicated by the selection information; the CPU including means for commanding the mode selector to select the one of the modes.

The selector circuit can include a switching circuit which is endowed with a hazard preventing function of synchronizing the clock signal selected currently and the clock signal selected anew and then switching the synchronized clock signals, in the case of selecting the clock signal.

The information processing equipment of the present invention can further comprise a battery which supplies electric power, and a power reserve detector circuit which detects a quantity of electric power remaining in the battery. In this case, the CPU can monitor a detected result of the power reserve detector circuit and can command the mode selector to select the first mode when the remaining power quantity of the battery has become lower than a preset power reserve value, thereby automatically performing a mode alteration.

The equipment can further comprise an input device through which a user of the equipment can give an instruction. In this case, the CPU can accept the instruction from the input device so as to afford the mode selection command.

Besides, thed CPU can further include means for generating a controlling window in a screen of the display unit and displaying an area for the mode selection on the window so as to accept the selecting instruction of the user.

The mode selector can include a memory in which the selection information indicating the mode to-be-selected is stored, in compliance with the selection command of the CPU.

In addition, the present invention can be so constructed that the display unit includes a display panel which is capable of displaying N colors; and a data conversion circuit which accepts the display information containing up to (N+M) colors, and which produces the display information in the corresponding colors based on the N displayable colors of the display panel and M combinations each consisting of two colors that are selected from among the N colors in order to display a neutral tint through alternate displays thereof at specified timings.

Further still, the display unit can include number-of-colors limitation means for producing the display information in up to the N colors in compliance with the input display information in up to the (N+M) colors in such a way that any of the M neutral tints contained in the input display information is substituted by one of the N colors, thereby limiting the maximum number of colors to-be-developed to N.

The maximum-number-of-colors selection means can be constructed so as to select either of the display information in up to the (N+M) colors as delivered from the data conversion circuit or the display information in up to the N colors as delivered from the number-of-colors limitation means, in accordance with the mode selection information delivered from the mode selector. Herein, the maximum-number-of-colors selection means can be provided in, for example, the display unit or the display control circuit.

Besides, the display memory can be constructed of a first memory and a second memory. In this case, the first memory may have a memory capacity which can store, at least, the display information in the number of colors to-be-developed required for the display in the first mode, while the second memory may have a memory capacity which can store, at least, the display information in the number of colors to-be-developed required for the display in the second mode, when the second memory is used conjointly with the first memory.

Also, the information processing equipment of the present invention can further comprise power dissipation control means for controlling power dissipation of the second memory. Herein, the power dissipation control means controls electric power to the second memory so as to cut off the electric power in the first mode and to supply the electric power in the second mode.

It is also possible to further comprise memory operation control means for controlling the operation of the second memory. Herein, the memory operation control means controls address information and control information so as to hold the second memory in a standby state in the first mode.

In another aspect of performance of the present invention, there is provided a display unit which displays display information in multiple colors within a predetermined number of colors to-be-developed, comprising: a display panel which is capable of displaying N colors; a data conversion circuit which accepts the display information containing up to (N+M) colors, and which produces the display information in the corresponding colors based on the N displayable colors of the display panel and M combinations each consisting of two colors that are selected from among the N colors in order to display a neutral tint through alternate displays thereof at specified timings; number-of-colors limitation means for producing the display information in up to the N colors in compliance with the input display information in up to the (N+M) colors in such a way that any of the M neutral tints contained in the input display information is substituted by one of the N colors tthereby limiting the maximam number of colors to-be-developed to N; and means for producing a command for selecting either of the display information in up to the (N+M) colors as delivered from the data conversion circuit or the display information in up to the N colors as delivered from the number-of-colors limitation means, in accordance with selection information which is input from outside the display unit.

According to the present invention, the mode selector can select either of at least two modes; the mode in which the display unit develops the smaller number of colors and operates at the lower frequency, or the mode in which the display unit develops the larger number of colors and operates at the higher frequency. The clock selector circuit receives the selection information to select the clock signal of the frequency corresponding to the mode indicated by the selection information, from among the plurality of clock signals delivered from the clock signal generator, and it delivers the selected clock signal to, at least, the display control circuit. In addition, the maximum-number-of-colors selection means selects the maximum number of colors which are to be developed by the display unit, in correspondence with the mode indicated by the selection information.

The frequency can be lowered down to a level at which an image quality does not degrade, in such a way that the smaller number of colors to-be-developed is set by the maximum-number-of-colors selection means. In this case, the maximum number of colors to-be-developed can be set at, for example, the number N in such a way that any of the M neutral tints contained in the input video information in, at most, the (N+M) colors is substituted by one of the N colors.

The power dissipation control means controls the electric power to the second memory so as to cut off the electric power in the first mode and to supply the electric power in the second mode. Besides, the memory operation control means controls the address information and the control information so as to hold the second memory in the standby state in the first mode. Thus, when the information processing equipment is used with the smaller number of colors to-be-developed, it is possible to operate only the first memory necessary for the number of colors and to hold the unnecessary second memory in the power cutoff state or the standby state.

When the frequency can be lowered in this manner, the display control circuit can be operated at the lower frequency. Thus, the power dissipation of not only the display control circuit, but also the display memory and the display unit are lowered.

Furthermore, since the display memory not required for the display is held in the power cutoff state or the standby state, the electric power can be curtailed to that extent.

In such an operating mode, the number of colors to-be-developed which the user can utilize is actually smaller. However, the power dissipation of the circuit portions concerning the display control can be reduced to ensure a long battery operable time period the equipment.

Of course, the equipment can also be used in the operating mode in which the number of colors to-be-developed is larger.

When some of the constituents of the equipment are altered or when constituents are partly added, further effects can be expected as follows:

In a case where the display control circuit is furnished with means for switching the number of colors to-be-developed, the display mode having the smaller number of colors to-be-developed can be set even in an information processing equipment employing a display unit which is not endowed with the function of switching modes in relation to the number of colors to-be-developed. It is therefore possible to attain the reduction in the power dissipation of the circuit portions concerning the display control.

Besides, when the equipment is so constructed that the operation of switching the clock signals and the operation of switching the numbers of colors to-be-developed can be interlockedly controlled, the oscillator of the lower frequency and the mode of the larger number of colors are not selected at the same time. It is accordingly possible to prevent software from setting erroneous information in the hardware architecture, resulting in the flickering of the FRC (frame rate control) display and the degradation of the image quality.

Further, owing to the provision of the power reserve detector circuit, when the quantity of electric power remaining in the battery has decreased, the operating mode is automatically shifted to the lower power dissipation mode without the user's concern, and a longer operable time period can be secured.

Still further, the malfunction of the display control circuit can be avoided by employing the selector circuit which prevents hazards from arising in the case of switching the clock signals.

BRIEF DESCRIPTION OF THE DRAWINGS

FIG. 9 is an explanatory diagram showing the truth table of a data conversion circuit which is the constituent of the FRC data generator circuit shown in FIG. 8;

FIG. 13 is an explanatory diagram showing the truth table of an FRC data removal circuit which is a constituent of the number-of-colors selector circuit shown in FIG. 12;

DETAILED DESCRIPTION OF THE PREFERRED EMBODIMENTS

Now, the embodiments of the present invention will be described in conjunction with the accompanying drawings.

Figure 1:
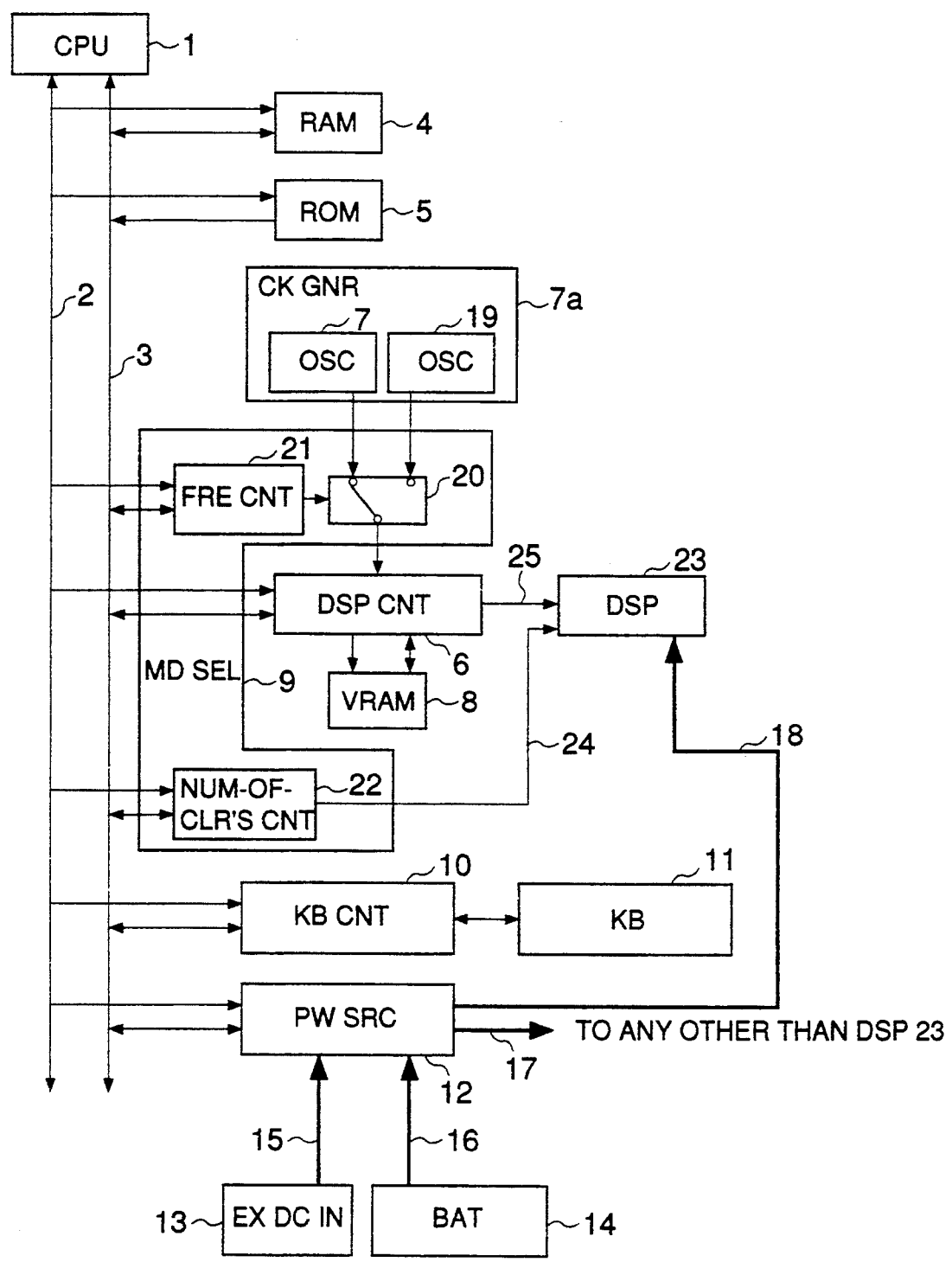
FIG. 1 is a block diagram showing the construction of the first embodiment of an information processing equipment according to the present invention.

FIG. 1 is a block diagram showing the construction of one embodiment of an information processing equipment to which the present invention is applied.

Referring to the figure, the information processing equipment in this embodiment includes as an information processing section, a central processing unit (hereinbelow, abbreviated to "CPU") 1; an address bus 2; a data bus 3; a random access memory (hereinbelow, abbreviated to "RAM") 4; a read-only memory (hereinbelow, abbreviated to "ROM") 5 in which programs are stored; a display memory 8 in which display information are stored; a display unit, such as an LCD (liquid-crystal display), 23 which can present a multicolor display within each of predetermined numbers of colors to-be-developed; a clock generator 7a which functions as means for generating clock signals of unequal frequencies; a mode selector 9 which selects any of the operating modes of the equipment and produces information on the selection; a display control circuit 6 which reads out the display information stored in the display memory 8 and causes the display unit 23 to display the read-out information; a selector circuit 20 which receives the selection information and selects the clock signal of the frequency corresponding to the mode indicated by the selection information; a keyboard 11 through which data, instructions etc. are entered by the user of the equipment; and a keyboard controller 10 which controls the operation of the keyboard 11.

In this embodiment, a VRAM (video random access memory) is employed as the display memory 8. Of course, the present invention is not restricted to the VRAM.

The clock generator 7a includes oscillators 7 and 19. These oscillators generate the clock signals of unequal frequencies.

The mode selector 9 functions as mode selection means for selecting one of the at least two modes; the mode in which the number of colors to-be-developed is smaller, but the display unit 23 is operated at the lower frequency, and the mode in which the number of colors to-be-developed is larger, and the display unit 23 is operated at the higher frequency. The mode selection means produces the selection information corresponding to the selected mode.

The display control circuit 6 controls the transfer of information between the CPU 1 and the VRAM 8. Also, it regularly reads out the stored display information of the VRAM 8 and produces video signals. The video signals are delivered to the display unit 23.

The selector circuit 20 functions as means for receiving the selection information to select that clock signal of the respective output clock signals of the oscillators 7 and 19 which has the frequency corresponding to the mode indicated by the selection information. This means delivers the selected clock signal to, at least, the display control circuit 6.

In addition, the information processing equipment of this embodiment includes as a power source section, an external DC (direct current) input terminal 13 through which DC electric power is received; a battery 14; a power source circuit 12 which is connected to the input terminal 13 through a line 15 and to the battery 14 through a line 16, and by which power source voltages required for the information processing section are produced from the external electric power or the electric power of the built-in battery 14; a feeder line 18 which feeds the power source voltage from the power source circuit 12 to the display unit 23; and a feeder line 17 which feeds the power source voltage to any circuit portion other than the display unit 23. Besides, when the external DC input terminal 13 is connected to an external DC power source, the power source circuit 12 functions to produce the power source voltages from the electric power of the external power source and to simultaneously charge the battery 14.

Herein, this embodiment is endowed with the function of saving electric power during the nonuse of the equipment, as another means for ensuring a longer operable time period under a situation where the battery 14 is used as a power source without connecting the external DC power source. This function is such that, when the equipment has not been externally operated for a predetermined time period, the CPU 1 affords a command to the power source circuit 12 through the address bus 2 and the data bus 3 so as to cut off the electric power to the display unit 23. Incidentally, this function of cutting off only the electric power to the display unit 23 may well be omitted.

The mode selector 9 includes a frequency control circuit 21 which designates the clock signal to be selected by the selector circuit 20, and a number-of-colors control circuit 22 which designates the number of colors to-be-developed to be selected by the display unit 23. This mode selector 9 selects either of the lower-power mode which employs the clock signal of the lower frequency, or the ordinary mode which employs the clock signal of the higher frequency. The command of the selection is afforded by the CPU 1 in this embodiment.

In FIG. 1, numeral 24 indicates a signal line through which the number-of-colors control circuit 22 transfers the information to the display unit 23, while numeral 25 indicates a signal line through which the display control circuit 6 transfers the information to the display unit 23.

The selector circuit 20 is operated in accordance with the selection information stored in the frequency control circuit 21. The frequency control circuit 21 has the selection information stored therein by the write operation of the CPU 1 through the address bus 2 and the data bus 3. Finally, the CPU 1 can set the frequency of the clock signal which is to be supplied to the display control circuit 6.

The number-of-colors control circuit 22 has the selection information set therein through the address bus 2 and the data bus 3 by the CPU 1. This circuit 22 delivers the selection information to the display unit 23 through the signal line 24, and designates the number of colors to-be-developed i.e. 4096 or 512. In the case where the number 512 is designated as the number of colors to-be-developed, the display unit 23 can display only the 512 colors with which the image quality thereof does not degrade, at a scanning frequency of 60 [Hz], and it cannot display more colors. By way of example, when color information contained in 3584 colors is intended to be displayed, it is converted into any color information contained in the 512 colors, and the resulting color information is displayed. Finally, the CPU 1 can set the number of colors to be developed by the display unit 23.

The display unit 23 adopts a technique in which the number of colors to-be-developed can be increased with the image quality ensured, by heightening the scanning frequency of the display screen of this unit 23. The technique is called the FRC (frame rate control) system. More specifically, the display unit 23 is originally capable of displaying N colors, and it is permitted to display the display information of (N+M) colors as the maximum number of colors to-be-developed, by additionally displaying M neutral tints each of which is presented in such a way that any two of the N colors are displayed alternately at specified timings. As will be explained later, the display unit 23 includes for such an operation, data conversion circuits which produce the neutral tints; input means for accepting the display information in up to the (N+M) colors; a selector circuit which functions as means for selecting either the number N or the number (N+M) as the maximum number of colors to-be-developed; and a display panel which displays the display information.

Concretely, in this embodiment, the display unit 23 can display up to 4096 colors when the scanning frequency of the display screen is 80 [Hz], while it can display up to 512 colors when the scanning frequency is 60 [Hz]. The limitation of the number of colors to-be-developed is the condition that the user attains a satisfactory image quality. Of course, it is possible to display the 4096 colors at 60 [Hz]. In this case, however, the display screen flickers to degrade the image quality thereof.

In order to cope with the two sorts of scanning frequencies, the oscillator 7 employed in this embodiment produces the clock signal at the frequency corresponding to the scanning frequency of 80 [Hz], and the oscillator 19 produces the clock signal at the frequency corresponding to the scanning frequency of 60 [Hz]. Either of these clock signals is selected by the selector circuit 20, and is supplied to the display control circuit 6.

Next, the operation of the information processing equipment thus constructed will be outlined.

The CPU 1 can read and write information from and into the various portions of the information processing equipment through the address bus 2 and the data bus 3. When the power source is turned ON, the CPU 1 reads the program stored in the ROM 5. Usually, the various circuit portions included in the equipment begin to be initialized in accordance with the program. Thereafter, the CPU 1 reads and runs any of various application programs stored in the RAM 4, for example, a document preparation/edit program or a table calculation program. Here, when the user has given the instruction of the mode selection from, for example, the keyboard 11, the CPU 1 affords the selection command as stated above, to the mode selector 9 in compliance with the instruction. Incidentally, the mode selecting instruction can be given at the time of start-up of the equipment. Of course, it may well be accepted at any desired later point in time.

In a case where the program running is the processing of displaying the information on the display unit 23, the CPU 1 writes the display information into the display control circuit 6 through the address bus 2 and the data bus 3. The display control circuit 6 stores the received display information in the VRAM 8. Further, the display control circuit 6 regularly reads the stored display information of the VRAM 8 and transfers the read information to the display unit 23 in accordance with the clock signal which is supplied by the oscillator 7 or 19 selected by the selector circuit 20. Thus, the display unit 23 can display the display information stored in the VRAM 8.

Here, the mode is set in such a way that the CPU 1 sets the predetermined information in the frequency control circuit 21 and the number-of-colors control circuit 22. That is, the equipment is set at either of the ordinary mode which can display the 4096 colors at 80 [Hz] in terms of the scanning frequency of the display screen, or the lower-power mode which can display the 512 colors at 60 [Hz]. When the mode set anew differs from the current mode, the latter is switched to the former. By way of example, the mode can be selected in such a manner that the ordinary mode is selected in the state in which the electric power is fed by connecting the external DC power source to the external DC input terminal 13, whereas the lower-power mode is selected in the state in which the electric power is fed by the battery 14. The user can designate such selection by starting a selection program.

Figure 4:
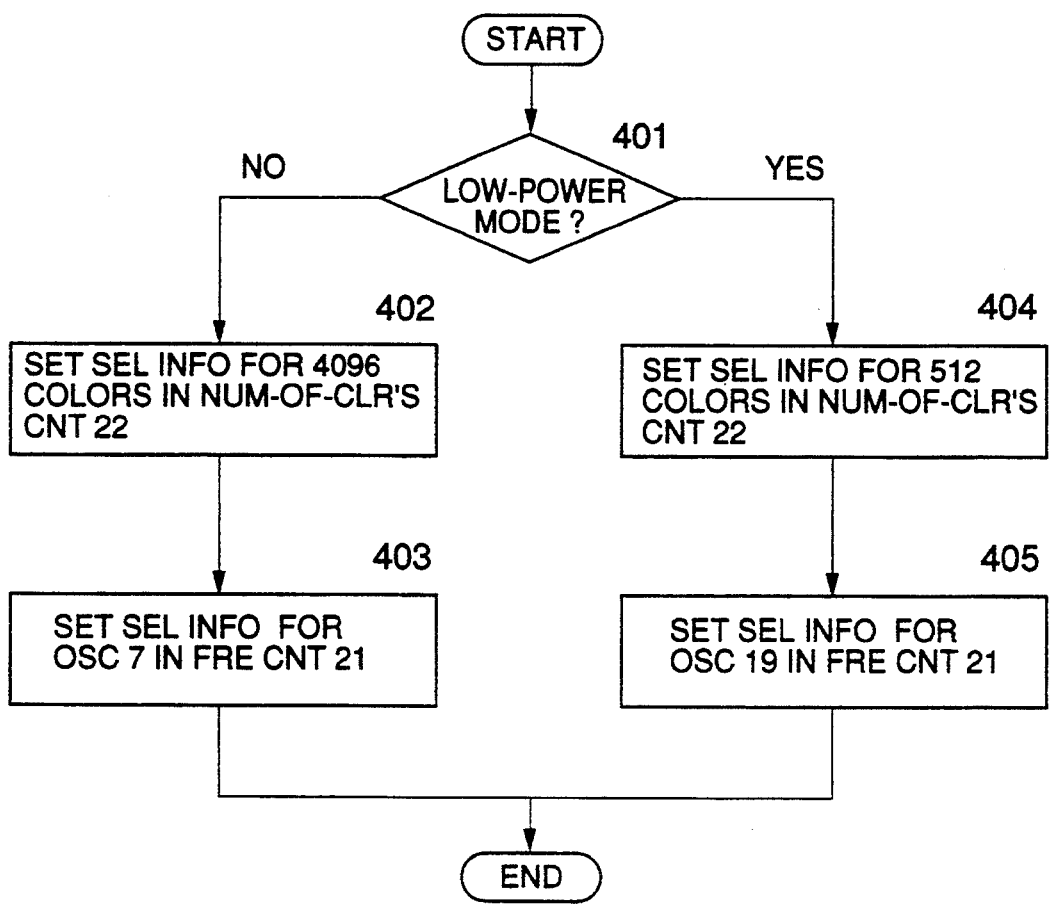
FIG. 4 is a flow chart showing the operating steps of a selection program which determines the operating mode of the equipment in the first embodiment.

A flow chart showing the steps of the selection program is depicted in FIG. 4. According to the steps shown in FIG. 4, the CPU 1 decides whether or not the lower-power mode is to be set (step 401). When the user's instruction is not the lower-power mode, the CPU 1 sets the selection information for selecting the 4096 colors, in the number-of-colors control circuit 22 (step 402). Subsequently, the CPU 1 sets the selection information for selecting the oscillator 7, in the frequency control circuit 21 (step 403). In contrast, when the instruction is the lower-power mode, the CPU 1 sets the selection information for selecting the 512 colors, in the number-of-colors control circuit 22 (step 404). Subsequently, the CPU 1 sets the selection information for selecting the oscillator 19, in the frequency control circuit 21 (step 405).

In the lower-power mode, the operating frequency of the display control circuit 6 is lower. It is therefore possible to suppress, not only the power dissipation of the display control circuit 6, but also those of the VRAM 8 and the display unit 23 which operate in subordination to the circuit 6. Thus, the power load of the battery 14 decreases, and an operable time period which is comparatively long can be secured. On the other hand, in the ordinary-power mode, the display in the multiple colors is realized.

The information which the user has entered with the keyboard 11, is transferred to the keyboard controller 10. The keyboard controller 10 converts the input information into information in a form which the CPU 1 can read. The CPU 1 receives the input information from the keyboard controller 10 through the address bus 2 and the data bus 3, and executes predetermined processing in accordance with the program stored in the RAM 4.

The electric power of the various circuit portions explained above is supplied from the power source circuit 12. The power source circuit 12 is adapted to receive the electric power from the external DC power source connected to the external DC input terminal 13 and from the battery 14 built into the equipment. The electric power received by the power source circuit 12 is supplied to the display unit 23 through the power source line 18, and to the circuit portions other than the display unit 23 through the power source line 17.

Figure 3:
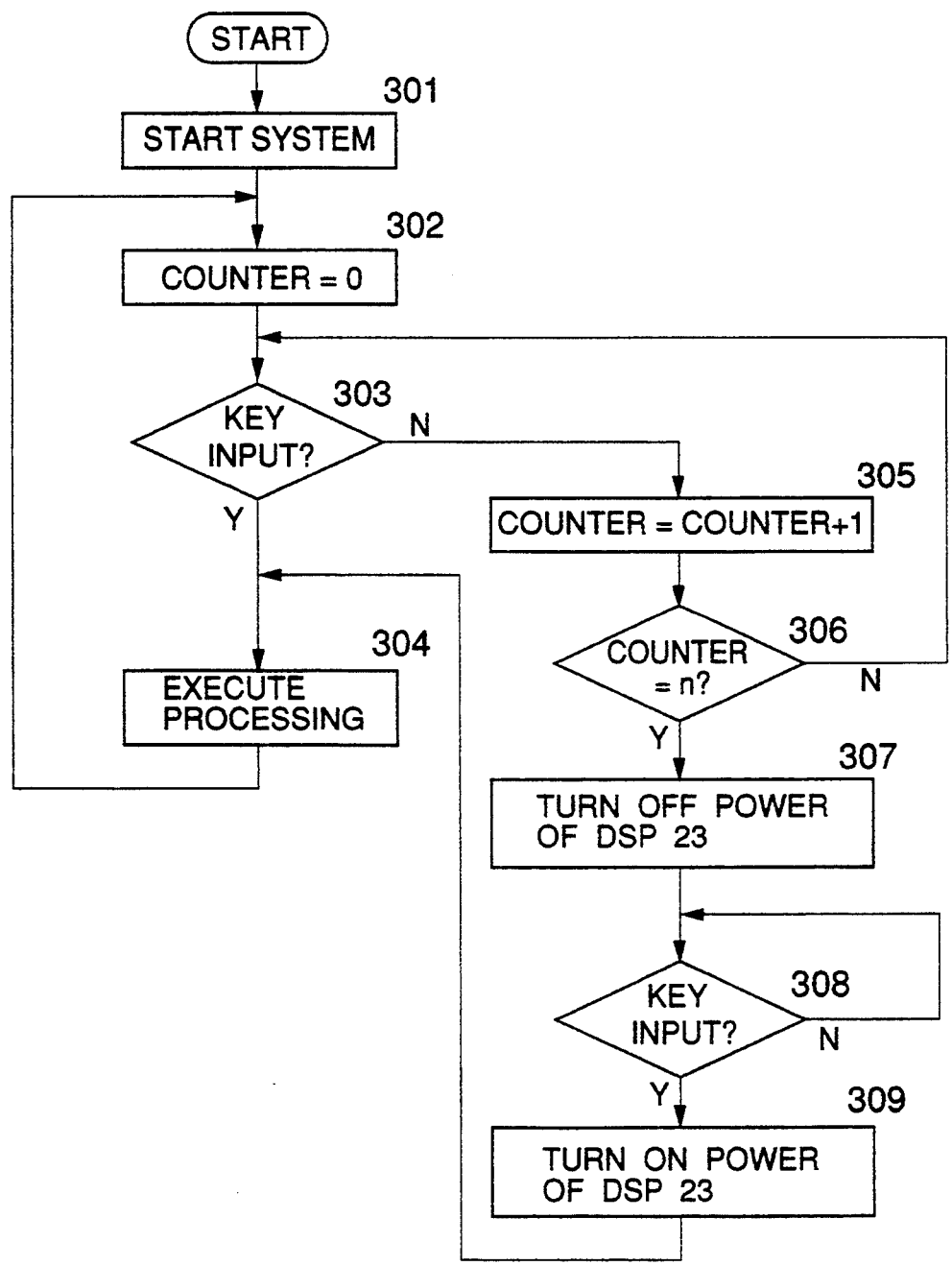
FIG. 3 is a flow chart showing the operating steps of that function of saving electric power during the nonuse of the equipment which can be bestowed on the embodiment of the present invention.

Next, that function of saving the electric power during the nonuse with which the information processing equipment of this embodiment is endowed will be explained with reference to FIG. 3. This figure is a flow chart showing the operating steps of the power saving function. According to the power saving function, when no key input has been received for a predetermined time period, it is decided that the equipment is lying in its idle state in which it is not being used or operated by the user, and the power source of the display unit 23 whose power dissipation is comparatively high is turned OFF to prevent wasteful power dissipation. The operation of such a function will be detailed below. Incidentally, this function can also be added to the other embodiments to be described later.

When the power source of the equipment has been turned ON, the system is started in accordance with the programs stored in the ROM 5 and the RAM 4 (step 301). The CPU 1 first sets a count value stored in the specified area of the RAM 4, to 0 (zero) (step 302). Subsequently, the CPU 1 decides whether or not there is a key input, on the basis of information which it has read from the keyboard controller 10 (step 303). In the presence of the key input, the CPU 1 executes predetermined processing, sets the count value to 0 and decides the presence or absence of a key input in accordance with the programs (steps 304, 302 and 303). In the absence of the key input at the step 303, the CPU 1 increments the count value by one, and it decides whether or not the count value has reached a predetermined value n (steps 305 and 306). In a case where the predetermined value n has not been reached, the routine returns to the decision of the step 303 as to whether or not there is a key input. On the other hand, in a case where the predetermined value n has been reached, the CPU 1 transfers information to the power source circuit 12 so as to turn OFF the electric power which is to be supplied to the display unit 23 (step 307). Thereafter, when a key input has been received, the CPU 1 starts the power supply to the display unit 23 so as to execute predetermined processing (steps 308 and 309).

When, in this manner, the superfluous power dissipation is prevented through the detection of the idle state, the battery operable time period of the equipment can be prolonged.

The details of the frequency control circuit 21, number-of-colors control circuit 22 and display unit 23 will be explained below.

Figure 5:
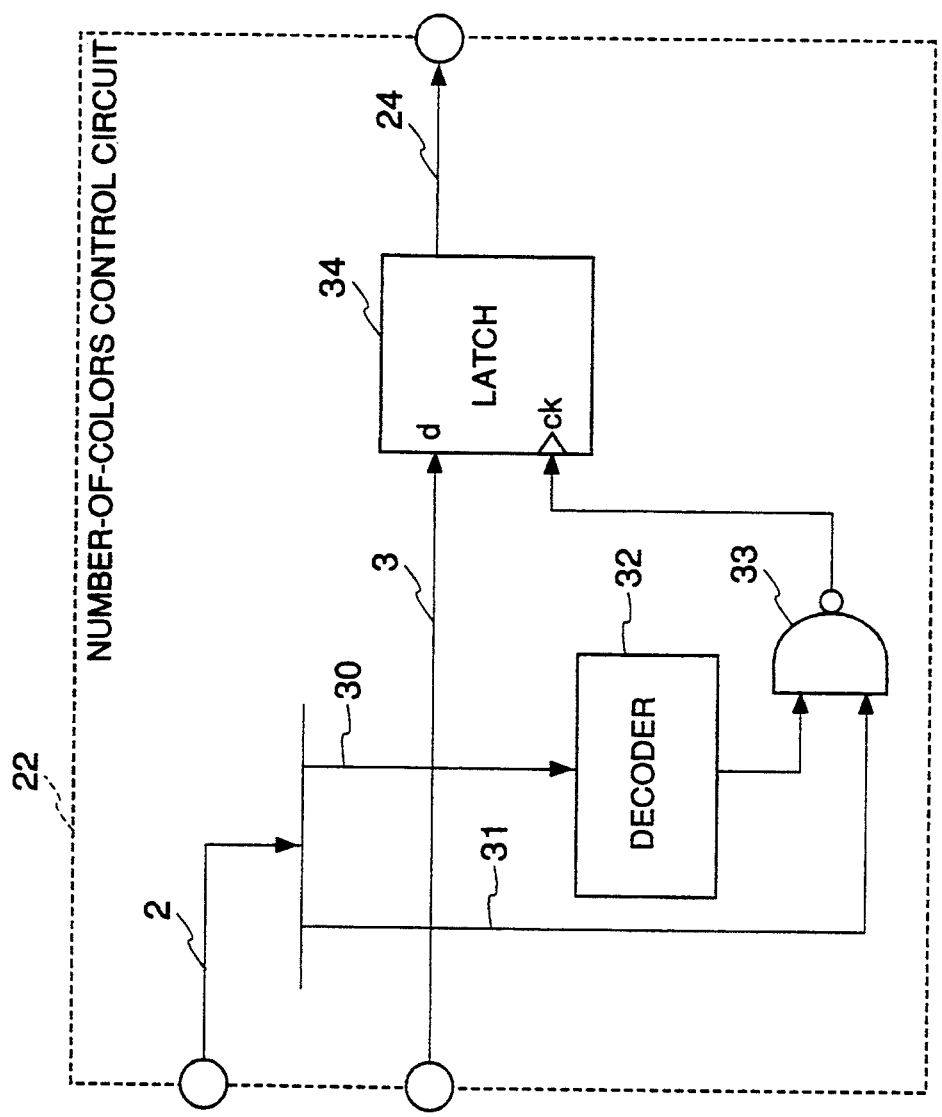
FIG. 5 is a block diagram showing the details of the number-of-colors control circuit which can be employed in the embodiment of the present invention.

FIG. 5 is a block diagram illustrative of the number-of-colors control circuit 22. In the figure, identical numerals are assigned to constituents which have the same functions as those of the constituents shown in FIG. 1. Referring to FIG. 5, numeral 30 denotes the address line of the address bus 2, numeral 31 a validity signal line which indicates that the address line 30 is valid, numeral 32 a decoder circuit, numeral 33 a NAND circuit, and numeral 34 a latch circuit in which the signal of a data input d is held in response to the leading edge of a clock input ck. Assuming that the CPU 1 can handle an address space of 1 [MB], the address line 30 consists of twenty signal lines.

Figure 2:
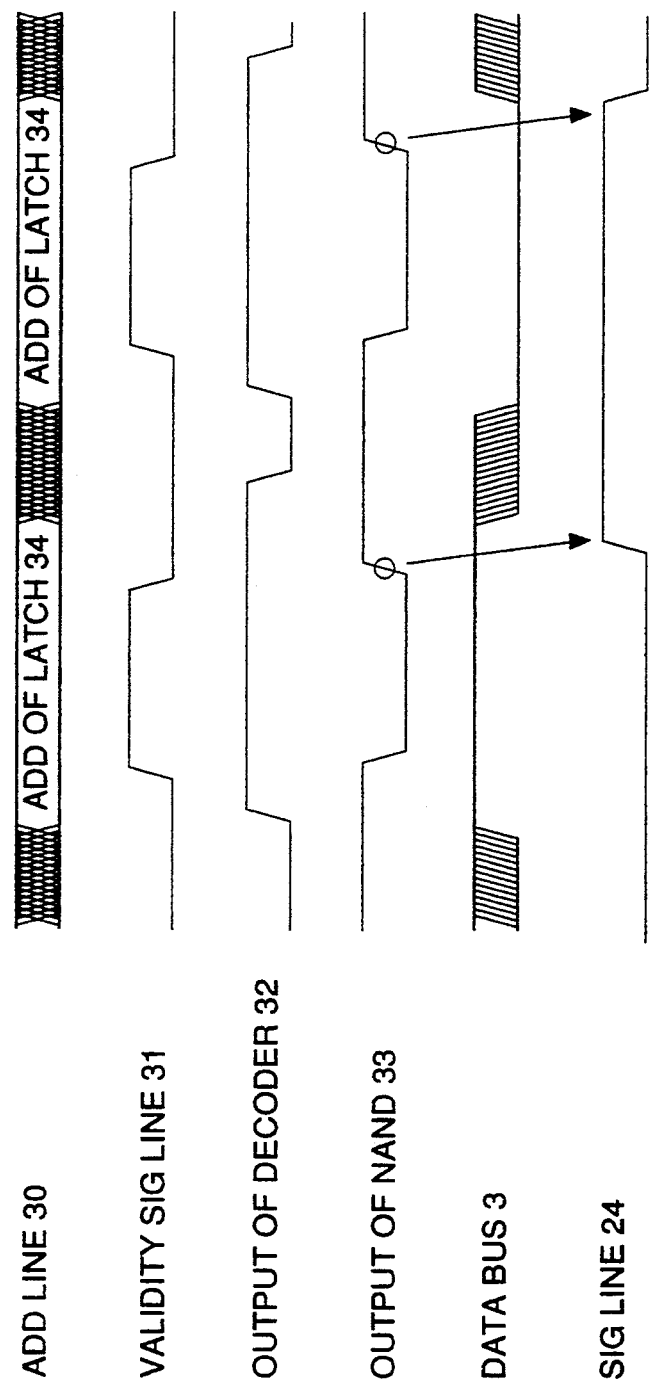
FIG. 2 is a time chart showing the operation of a number-of-colors control circuit which is employed in the embodiment of the present invention.

A time chart showing the operation of the number-of-colors control circuit 22 is depicted in FIG. 2. The decoder circuit 32 produces "H" (a high level) in the state in which the address line 30 indicates the address of the latch circuit 34, whereas it produces "L" (a low level) in any other state. The validity signal line 31 falls into the "H" state during the period for which the address line 30 is valid, and into the "L" state during the period for which the line 30 is invalid. Therefore, the NAND circuit 33 is usually in the "H" state, but it falls into the "L" state when the latch circuit 34 has been accessed. Herein, the latch circuit 34 accepts the information of the data bus 3 in response to the leading edge of the output signal of the NAND circuit 33 and delivers it to the signal line 24. Thus, the latch circuit 34 can hold the status of the least significant bit of the data bus 3. Let it be assumed that the "H" state of the signal line 24 indicates the number 512 as the number of colors to-be-developed, while the "L" state thereof indicates the number 4096. Then, the number 512 of the colors can be set when the CPU 1 writes "1" into the allocated address of the latch circuit 34, while the number 4096 can be set when it writes "0".

The frequency control circuit 21 can be realized by a construction similar to that of the number-of-colors control circuit 22 shown in FIG. 5. It is necessary, however, to alter the decoder circuit 32 so as to indicate an address allocated to the frequency control circuit 21. In addition, the operation of writing data into a circuit which corresponds to the latch circuit 34 is set in correspondence with the number-of-colors Control circuit 22 so that the lower frequency may be selected by writing "1", while the higher frequency may be selected by writing "0".

Next, the details of the display unit 23 will be explained by mentioning a liquid-crystal display as an example.

Figure 6:
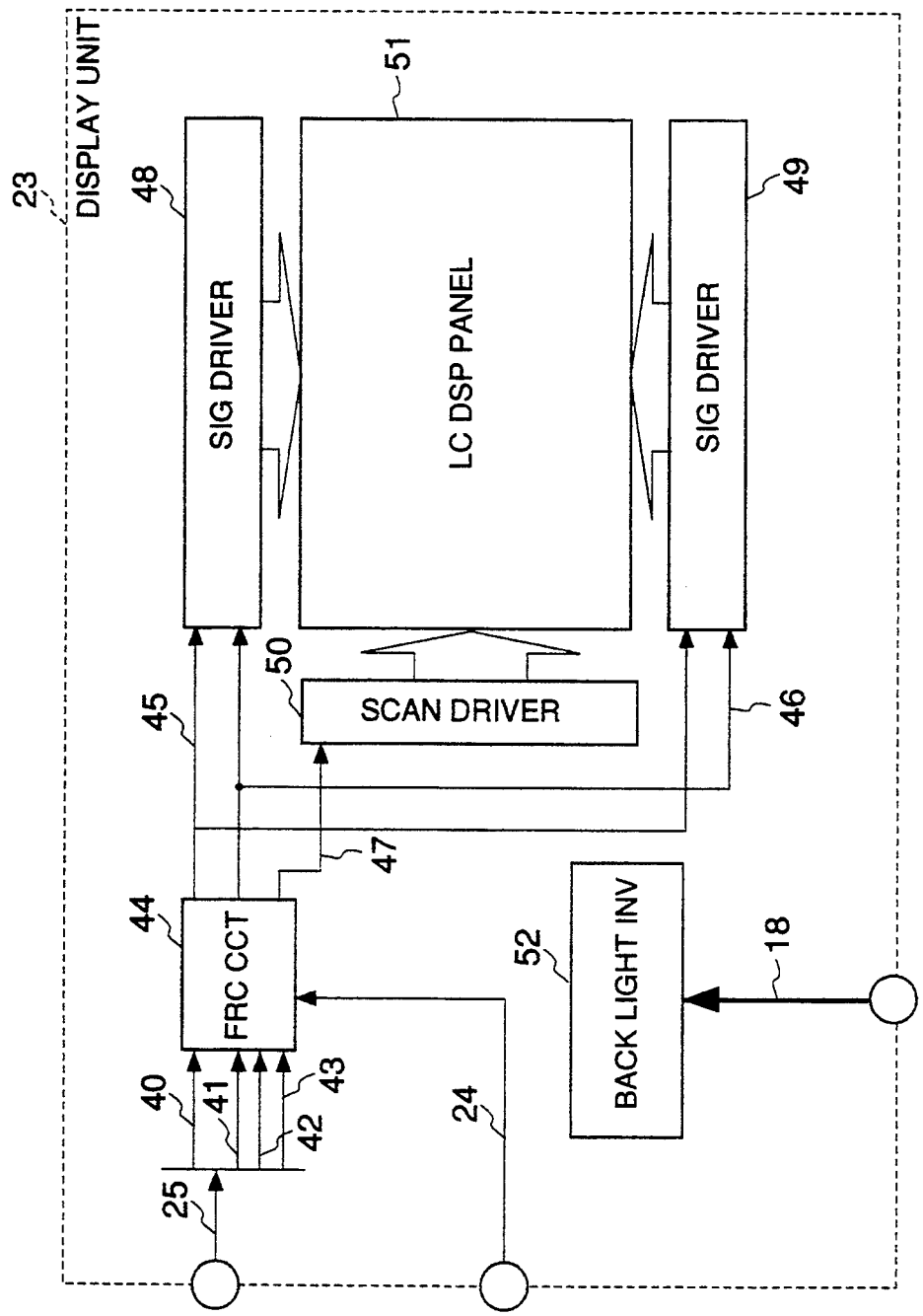
FIG. 6 is a block diagram showing the details of a display unit which can be employed in the embodiment of the present invention.

FIG. 6 is an internal block diagram of the display unit 23. In the figure, identical numerals are assigned to constituents which have the same functions as those of the constituents shown in FIG. 1.

The display unit 23 employed in this embodiment includes an FRC (frame rate control) circuit 44 which increases the number of colors to be developed by this display unit, signal drivers 48 and 49 each of which accepts display data for one line, a scanning driver 50 which designates a line to be scanned, and a liquid-crystal display panel 51 which is driven by the signal drivers 48 and 49 and the scanning driver 50 and which actually presents a video image. Also, it includes a back light portion, not shown, which illuminates the front side of the liquid-crystal display panel 51 from the rear side thereof, and a back light inverter 52 which drives the back light portion. In the figure, numeral 40 indicates a display data line included in the signal line 25, numeral 41 a clock signal line for latching the information of the display data line 40, numeral 42 a line for a horizontal synchronizing signal, numeral 43 a line for a vertical synchronizing signal, numeral 45 an FRC display signal line, numeral 46 a horizontal clock signal line for latching the information of the FRC display signal line 45, and numeral 47 a line for a vertical clock signal whose cycle corresponds to one display line.

The display data line 40 has an information content of 12 [bits] in order to represent each of the 4096 colors possible for the dots. Since the colors are usually expressed by the three components of red (R), green (G) and blue (B), the information of 12 [bits] are composed of the components each consisting of 4 [bits]. On the other hand, the FRC display signal line 45 is constructed with each of the R, G and B components consisting of 3 [bits], because of the limitation of the signal drivers 48 and 49. Accordingly, the liquid-crystal display panel 51 basically displays the 512 colors with 9 (=3×3) [bits]. The technique which displays the 4096 colors on the liquid-crystal display panel 51 as stated above, is the FRC system. The details of the FRC circuit 44 will be explained later.

The liquid-crystal display panel 51 has (1120×3) pixels in the horizontal direction thereof, and 780 pixels in the vertical direction thereof. It has a resolution of (1120×780) [dots] because the three pixels of R, G and B constitute one dot. The signal drivers 48 and 49 drive each pixel with any of three levels of electric potential, so that the liquid-crystal display panel 51 can display each pixel with display intensities of three levels. The 512 colors are displayed for each dot by such principles.

Each of the signal drivers 48 and 49 is adapted to hold an information content of 1680 [bits] which is equal to half of the data (1120×3 [bits]) of one horizontal line. When the data for one line is complete, the signal drivers 48 and 49 simultaneously drive the liquid-crystal display panel 51 in correspondence with one line. To this end, each of the signal drivers 48 and 49 is connected with the liquid-crystal display panel 51 by 1680 signal lines. It is the scanning driver 50 that appoints which of the lines of the liquid-crystal display panel 51 the data of one line are to be displayed at. The scanning driver 50 is connected with the liquid-crystal display panel 51 by 780 signal lines. When the first line of the panel 51 is to be scanned, the scanning driver 50 activates only the signal line corresponding thereto. Likewise, the scanning driver 50 scans the panel 51 down to the 780th line thereof in succession. Thus, the video image is presented on the liquid-crystal display panel 51.

The horizontal clock line 46 transfers a horizontal clock signal which serves for the signal drivers 48 and 49 to accept the data of the FRC display signal line 45. On the other hand, the vertical clock line 47 transfers the vertical clock signal for notifying the scanning driver 50 that the data of one succeeding line of the panel 51 have been held in the signal drivers 48 and 49. In response to this clock signal, the scanning driver 50 activates the signal line of the succeeding line. Such clock signals of the horizontal clock line 46 and vertical clock line 47 are produced from the clock signal of the line 41, the horizontal synchronizing signal of the line 42 and the vertical synchronizing signal of the line 43 in the FRC circuit 44.

Next, the details of the FRC circuit 44 will be explained.

Figure 7:
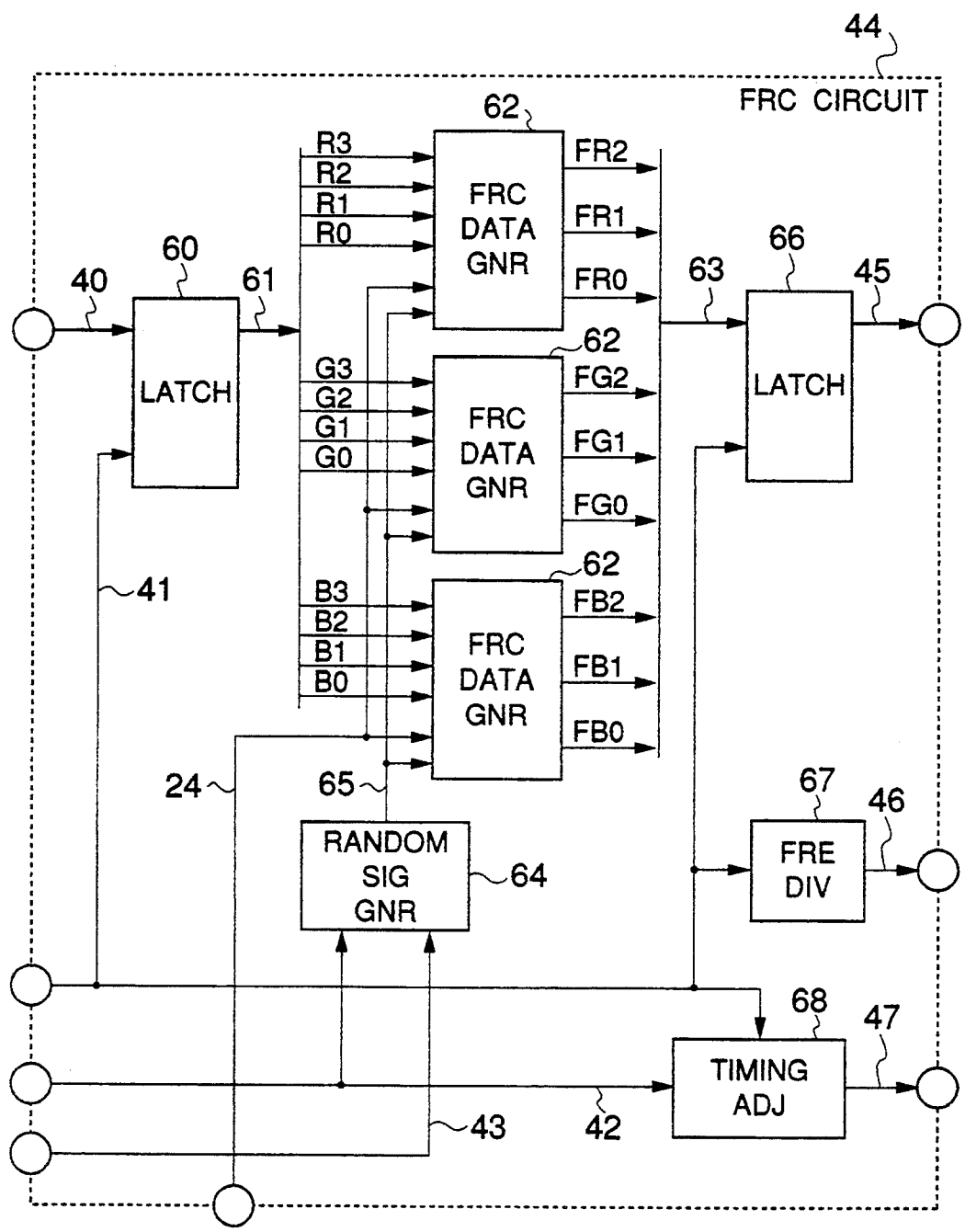
FIG. 7 is a block diagram showing the details of an FRC (frame rate control) circuit which is the constituent of the display unit shown in FIG. 6.

FIG. 7 is an internal block diagram of the FRC circuit 44. In the figure, identical numerals are assigned to constituents which have the same functions as those of the constituents shown in FIG. 6.

The FRC circuit 44 shown in FIG. 7 includes a latch circuit 60 which has a capacity of 12 [bits]; FRC data generator circuits 62 which are respectively arranged in correspondence with R (red), G (green) and B (blue); a random signal generator circuit 64 which generates a switching signal for realizing an FRC display free from flickering; a latch circuit 66 which has a capacity of 9 [bits]; a frequency divider circuit 67 which doubles a clock cycle; and a timing adjustment circuit 68 which adjusts the phase of the horizontal synchronizing signal on the line 42. Incidentally, in the figure, numeral 61 indicates a display data line consisting of 12 signal lines, numeral 63 an FRC data line consisting of 9 signal lines, and numeral 65 a random signal line.

The latch circuit 60 accepts the information of the display data line 40 at the timing of the clock signal of the line 41, and delivers the accepted information to the display data line 61. In order to transfer the information in the 4096 colors, the display data line 61 is configured of the 12 signal lines which transfer signals R3~R0, G3~G0 and B3~B0 totaling twelve, respectively. Among the 12 signal lines, those for transferring the signals R3~R0 are connected to one of the FRC data generator circuits 62. Likewise, the signal lines for transferring the signals G3~G0 and the signal lines for transferring the signals B3~B0 are respectively connected to the corresponding FRC data generator circuits 62. In addition, the signal line 24 and the random signal line 65 are respectively connected as input lines to all of the FRC data generator circuits 62.

The respective FRC data generator circuits 62 generate signals FR2~FR0, FG2~FG0 and FB2~FB0 on the basis of the inputs stated above, and deliver these signals to the FRC data line 63. The FRC display system is such that two tone or gradation levels different from each other are switched and displayed every frame scanning, thereby presenting a halftone level intermediate between the two tone levels. By way of example, the FRC data generator circuit 62 for the color R executes processing necessary for the FRC display and can generate the signals FR2~FR0 capable of displaying tones of 16 levels. The information of the FRC data line 63 composed of the signals FR2~FR0, FG2~FG0 and FB2~FB0 are of 9 [bits], and have an information content capable of displaying the 4096 colors. The details of the FRC data generator circuit 62 will be explained later. The information of the FRC data line 63 are delivered to the FRC display signal line 45 after the timings of the respective signals have been brought into agreement by the latch circuit 66.

The frequency divider circuit 67 doubles the cycle of the clock signal of the clock signal line 41, and delivers the resulting signal to the horizontal clock line 46. The signal driver 48 in FIG. 6 and the signal driver 49 accept the information of the FRC display signal line 45 at the leading edge of the horizontal clock signal and the trailing edge thereof, respectively. Finally, the signal drivers 48 and 49 accept the information of the FRC display signal line 45 alternately in single-dot units. The timing adjustment circuit 68 delays the horizontal synchronizing signal of the line 42 two clock cycles of the clock signal line 41 in order to make it inphase with the information of the FRC display signal line 45. The delayed signal is delivered to the vertical clock line 47.

The random signal generator circuit 64 generates the random signal of the line 65. The FRC display technique gives rise to flickering in a case where the response rate of the display operation is high. In order to relieve the flickering it is necessary to contrive a method of switching tones and to raise the scanning frequency of the screen of the display panel 51. In order to meet the former requirement, the two tone levels are switched, not only in single-frame scanning unit, but also in single-line display unit, and the allocation of the line and the tone level is switched in single-frame scanning unit. The random signal generator circuit 64 performs such controls. More specifically, when an even-numbered line and an odd-numbered line are respectively displayed at a higher tone level and a lower tone level in a certain frame scanning operation, the random signal generator circuit 64 reverses the correspondence of the lines and the levels in the next frame scanning operation. Concretely, when the random signal line 65 becomes "H" (high) at an even-numbered line and "L" (low) at an odd-numbered line in a certain frame scanning operation, it becomes "L" at the even-numbered line and "H" at the odd-numbered line in the next frame scanning operation. On the other hand, it is also indispensable to raise the screen scanning frequency. In the case where the signal line 24 designates the 512 colors, the FRC display operation is not performed, so that the display does not flicker at the scanning frequency of 60 [Hz]. In contrast, in the case where the signal line 24 designates the 4096 colors, the FRC display operation is performed, so that the scanning frequency needs to be increased to 80 [Hz].

Figure 8:
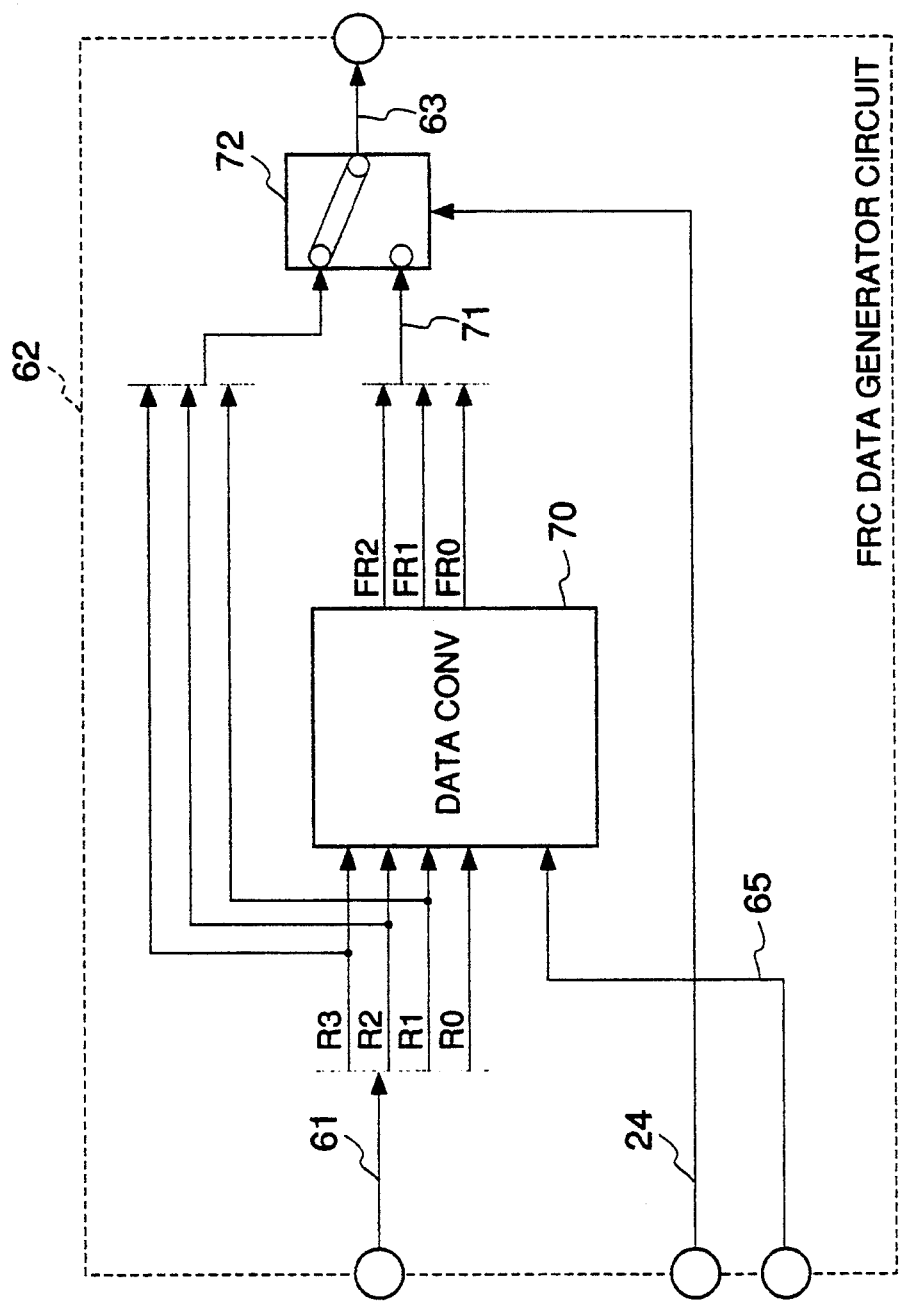
FIG. 8 is a block diagram showing the details of an FRC data generator circuit which is the constituent of the FRC circuit shown in FIG. 7.

FIG. 8 is an internal block diagram of the FRC data generator circuit 62. In the figure, identical numerals are assigned to constituents which have the same functions as those of the constituents shown in FIG. 7.

The FRC data generator circuit 62 shown in FIG. 8 includes a data conversion circuit 70, and a selector circuit 72. Incidentally, numeral 71 in the figure indicates an FRC display data line.

The data conversion circuit 70 is constructed of, for example, a programmable logic array. That is, it is constructed by combining and connecting groups of logic circuit elements so as to realize a truth table which will be explained later. Herein, the data conversion circuit 70 is supplied with the information of the display data line 61 and the random signal line 65, whereupon it supplies the FRC display data to the FRC display data line 71 in accordance with the combination of the groups of logic circuit elements.

The selector circuit 72 selects either the signals of the FRC display data line 71 or the signals R3~R1 of the display data line 61 in accordance with the information of the signal line 24, and delivers the selected signals to the FRC data line 63. Finally, the display data line 61 is selected when the signal line 24 designates the 512-color mode, whereas the FRC display data line 71 is selected when the signal line 24 designates the 4096-color mode. In this manner, the modes concerning the number of colors to-be-developed can be switched by the selector circuit 72.

Next, the function of the data conversion circuit 70 will be explained with reference to FIG. 9. This figure illustrates the truth table of the data conversion circuit 70. The inputs of the data conversion circuit 70 are the signals of the display data line 61 and random signal line 65, while the outputs thereof are the signals of the FRC display data line 71. As seen from the illustrated truth table, tone or gradation levels #14, #12, #10, #8, #6, #4, #2 and #1 are displayed by the FRC technique in order to realize tone displays of 16 levels. By way of example, the level #14 is displayed in such a way that the code sets "111" and "110" of the FRC display data line 71 are switched by the information of the random signal line 65. Accordingly, the actual intensity level of the level #14 becomes intermediate between the intensities of the code sets "111" and "110". Regarding each of the other tone levels for which the FRC technique is not utilized, the displays of two intensity levels need not be switched, and hence, the information of the random signal line 65 has no significance. The information is indicated by "x" in the truth table.

Although this embodiment has mentioned the oscillators 7 and 9 as the example of the means for generating the plurality of clock signals, the present invention is not restricted to the example. The plurality of clock signals may well be generated by dividing the frequency of the clock signal of a single oscillator by way of example. This holds true also of the other embodiments to be described later.

As thus far described, according to this embodiment, the 4096-color mode and the 512-color mode can be selected. Moreover, since the circuit portions relevant to the display control are operated at 60 [Hz] in the case of selecting and applying the mode of the 512 colors, the power dissipation can be reduced, and the battery operable time period can be made longer. However, the present invention is not restricted to the foregoing embodiment, but it can be performed as the ensuing embodiments by way of example.

Now, the second embodiment of the present invention will be described with reference to the drawings.

Figure 10:
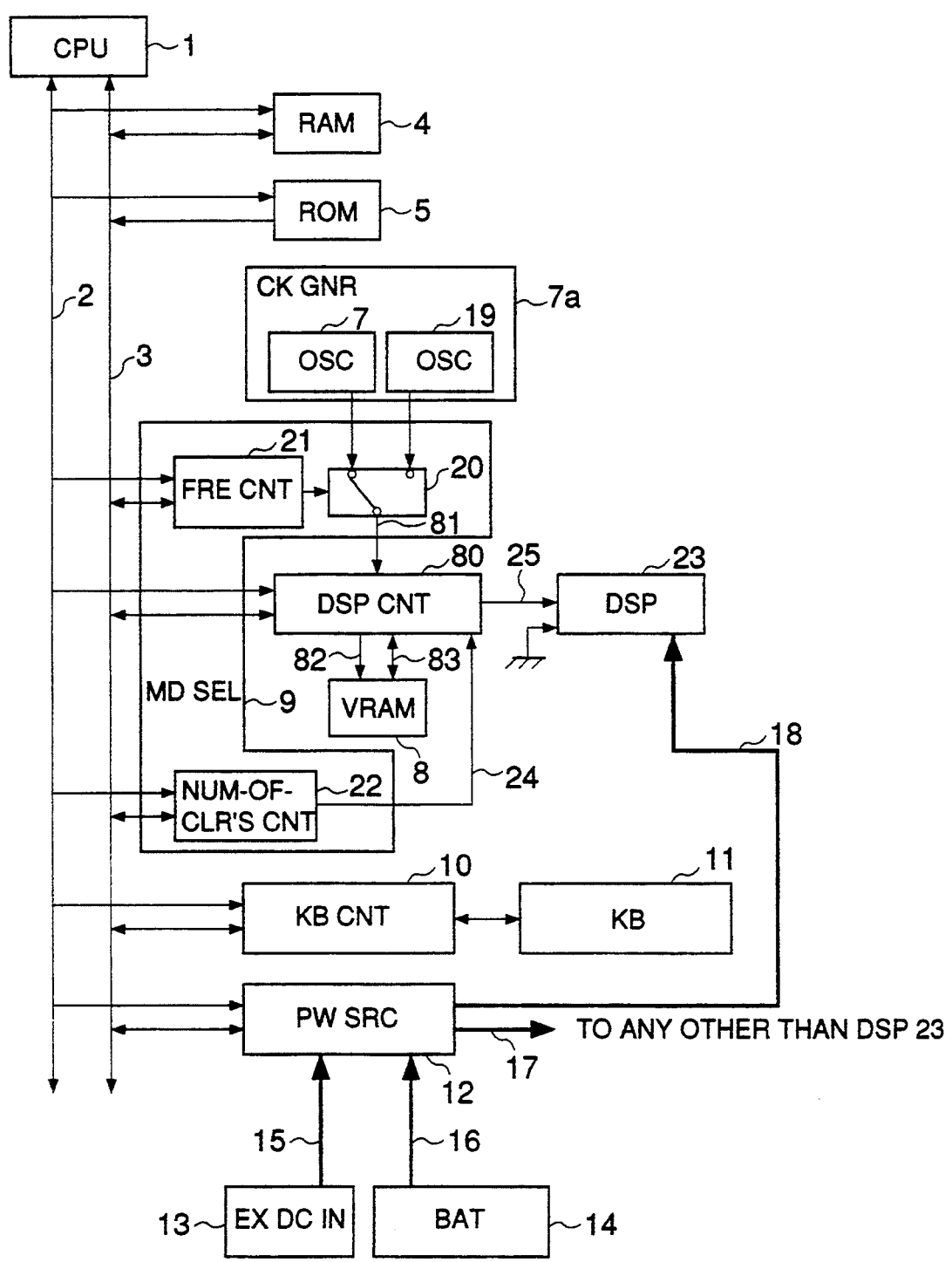
FIG. 10 is a block diagram showing the construction of the second embodiment of the information processing equipment of the present invention.

FIG. 10 is a block diagram of an information processing equipment showing the second embodiment. In the figure, identical symbols are assigned to the same constituents and signals as in the embodiment shown in FIG. 1, and they shall not be repeatedly explained.

Referring to FIG. 10, numeral 80 denotes a display control circuit which can control the number of colors to-be-developed, numeral 81 a clock line which supplies the clock signal to the display control circuit 80, numeral 82 the address line of the VRAM 8, and numeral 83 the data line of the VRAM 8. In addition, the display unit 23 is fixed to the 4096-color mode. The display control circuit 80 receives information through the signal line 24 from the number-of-colors control circuit 22, and can select either of the 4096-color mode or the 512-color mode. In short, this embodiment differs from the first embodiment in that the color development modes are switched by the display control circuit 80, not by the display unit 23. The remaining construction and operations are the same as in the first embodiment, and shall be omitted from description. The display control circuit 80 which forms the essential point of this embodiment, will be explained in detail below.

Figure 11:
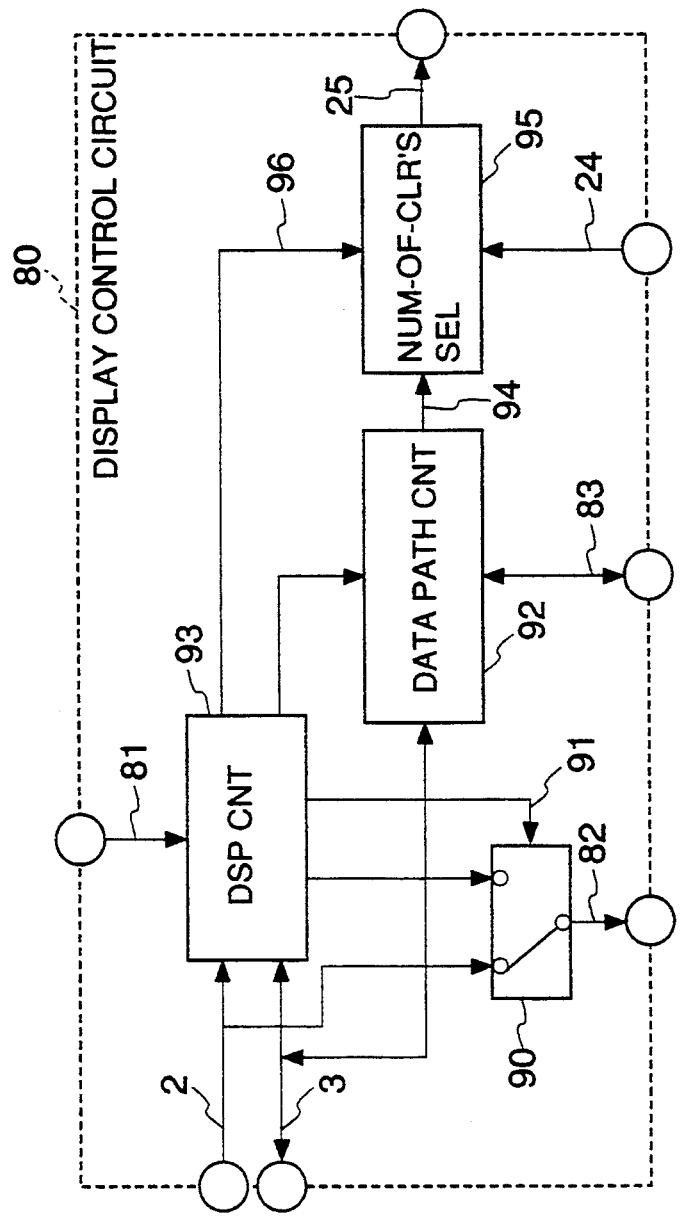
FIG. 11 is a block diagram showing the details of a display control circuit which is employed in the embodiment shown in FIG. 10.

FIG. 11 is a block diagram illustrative of the display control circuit 80. In the figure, identical numerals are assigned to constituents which have the same functions as those of the constituents shown in FIG. 10.

The display control circuit 80 shown in FIG. 11 includes a display controller 93, a selector circuit 90, a data path controller 92, and a number-of-colors selector circuit 95. In the figure, numeral 91 indicates a display timing signal line, numeral 94 a display data line, and numeral 96 a timing signal line for controlling the number-of-colors selector circuit 95.

The display controller 93 generates address information for successively reading out the stored information of the VRAM 8 in order to perform the display scanning, and supplies the display, timing signal line 91 with display timing information for indicating that the address information is in valid periods. Further, it produces timing signals which are respectively applied to the data path controller 92 and the number-of-colors selector circuit 95.

In accordance with the information of the display timing signal line 91, the selector circuit 90 selects the output address information of the display controller 93 in the valid period and the address information of the address bus 2 in the other period. Consequently, the CPU 1 shown in FIG. 10 can access the VRAM 8 during the period other than the valid period.

The data path controller 92 controls the flow of the information which is read out of the VRAM 8 through the data line 83. In the data path controller 92, the information to be accessed by the CPU 1 and the display information to be read out of an address generated by the display controller 93 are respectively distributed to the data bus 3 and to the display data line 94. It is the information in the 4096 colors that is transferred to the number-of-colors selector circuit 95 through the display data line 94.

The number-of-colors selector circuit 95 complies with the information of the signal line 24 to convert the 4096-color information into the 512-color information which is not subjected to the FRC display processing in the display unit 23, and it delivers the resulting information to the display data line 25. That is, the number-of-colors selector circuit 95 functions as maximum-number-of-colors selection means for receiving the selection information from the number-of-colors control circuit 22 so as to select the maximum number of colors to-be-developed to be displayed by the display unit 23, in correspondence with the mode indicated by the selection information.

Next, the details of the number-of-colors selector circuit 95 will be explained.

Figure 12:
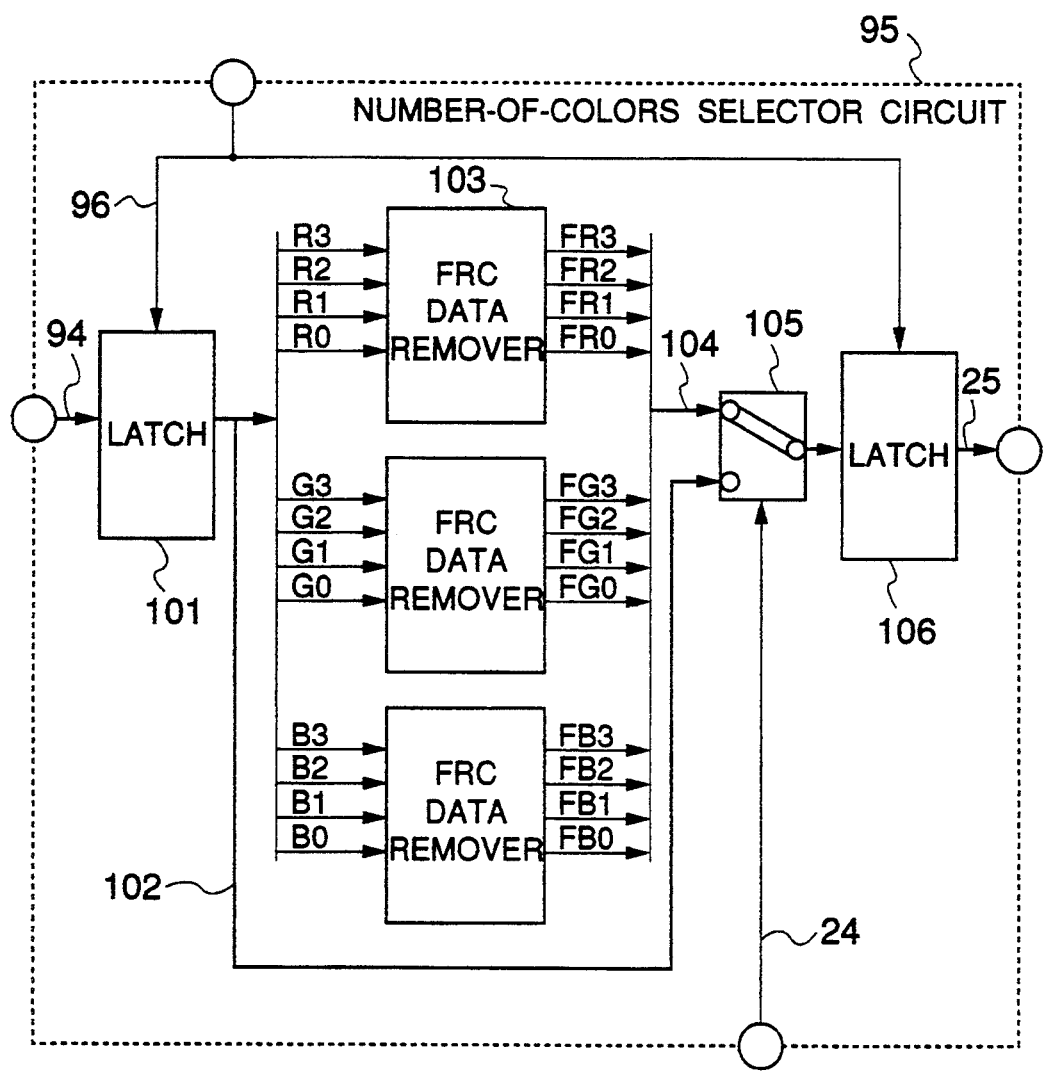
FIG. 12 is a block diagram showing the details of a number-of-colors selector circuit which is a constituent of the display control circuit shown in FIG. 11.

FIG. 12 is a block diagram of the number-of-colors selector circuit 95. In the figure, identical symbols are assigned to constituents which have the same functions as those of the constituents shown in FIG. 11.

The number-of-colors selector circuit 95 shown in FIG. 12 includes latch circuits 101 and 106 which latch information in accordance with the timing of the timing signal line 96, FRC data removal circuits 103, and a selector circuit 105. In the figure, numeral 102 indicates a 4096-color display data line, and numeral 104 a 512-color display data line.

The information latched by the latch circuit 101 are transferred to the FRC data removal circuits 103 through the 4096-color display data line 102. The information are of 12 [bits], which are distributed to the three FRC data removal circuits 103, so that each circuit 103 receives 4 [bits].

The FRC data removal circuit 103 is constructed of, for example, a programmable logic array. That is, it is constructed by combining and connecting groups of logic circuit elements so as to realize a truth table which will be explained later. Herein, the FRC data removal circuit 103 converts those 16 tones of information which are subjected to the FRC display operation in the display unit 23, into appropriate information which are not subjected to the FRC display operation. Accordingly, although the information transferred to the 512-color display data line 104 are composed of 4 [bits], they actually become information of 8 tones. The outputs of the three FRC data removal circuits 103 are added up to form the display information in the 512 colors. The details of the FRC data removal circuit 103 will be explained later.

The selector circuit 105 selects either of the display information of the 4096-color display data line 102 or 512-color display data line 104 in accordance with the signal of the signal line 24, and delivers the selected display information to the latch circuit 106. The latch circuit 106 latches the delivered information and then supplies them to the display data line 25. Owing to such a construction, the display unit 23 need not have the function of switching the modes concerning the numbers of colors to-be-developed.

The function of the FRC data removal circuit 103 will be explained with reference to FIG. 13. This figure illustrates the truth table which expresses the operation of the FRC data removal circuit 103. The inputs of the FRC data removal circuit 103 are the signals of the 4096-color display data line 102, while the outputs thereof are the signals of the 512-color display data line 104. As in the truth table shown in FIG. 9, tone or gradation levels #14, #12, #10, #8, #6, #4, #2 and #1 are displayed by the FRC technique. Accordingly, the information of these tone levels are converted into the nearest tone levels. As indicated in FIG. 13, the tone level #14 is converted into the level #15, the level #12 into the level #13, the level #10 into the level #11, the level #8 into the level #9, the level #6 into the level #7, the level #4 into the level #5, the level #2 into the level #3, and the level #1 into the level #0. The other levels are not converted. Owing to such converting operations, the information of the 16 tones are turned into those of the 8 tones.

As thus far described, according to the second embodiment, even in the information processing equipment employing the display unit which does not have the function of switching the modes concerning the number of colors to-be-developed, the function of setting the 512-color display mode can be realized by furnishing the display control circuit 80 with the means for switching the number of colors. It is therefore possible to lower the power dissipation of the circuit portions relevant to the display control.

Now, the third embodiment of the present invention will be described with reference to the drawings.

Figure 14:
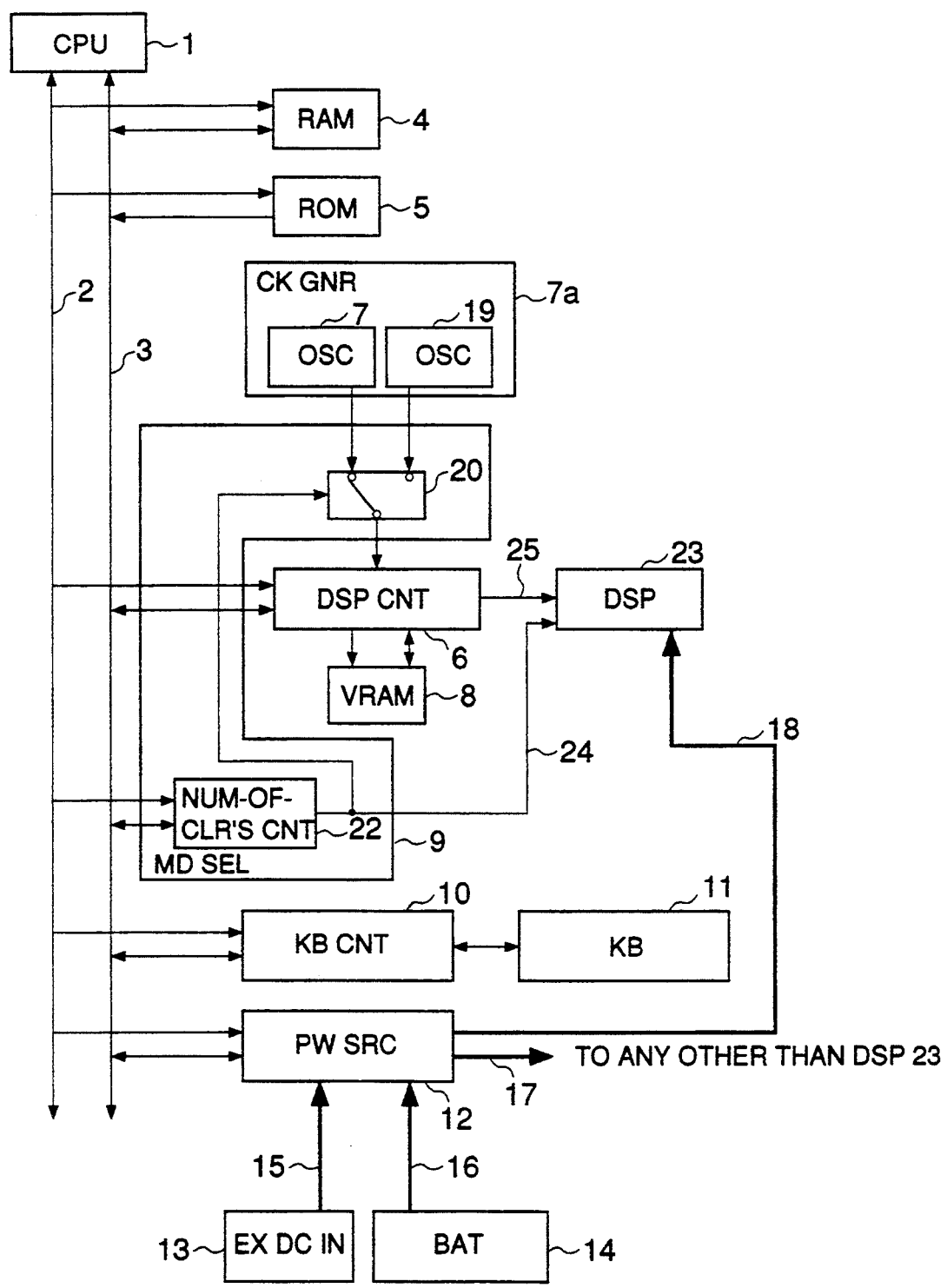
FIG. 14 is a block diagram showing the construction of the third embodiment of the information processing equipment of the present invention.

FIG. 14 is a block diagram of an information processing equipment showing the third embodiment. In the figure, identical symbols are assigned to constituents having the same functions as those of the constituents shown in FIG. 1.

The point of difference of this embodiment from the embodiment shown in FIG. 1 consists in the construction of the mode selector 9. The mode selector 9 of this embodiment is so constructed that the frequency control circuit 21 of the embodiment shown in FIG. 1 is dispensed with, and that the information of the signal line 24 delivered from the number-of-colors control circuit 22 controls the clock signal selection of the selector circuit 20. Regarding the other points, this embodiment has the same construction and operations as those of the embodiment shown in FIG. 1. Accordingly, the point of difference shall be chiefly elucidated here without repeated description.

In the third embodiment, the selector circuit 20 selects the clock signal (80 [MHz]) of the oscillator 7 in compliance with the setting of the 4096-color mode in the number-of-colors control circuit 22, while it selects the clock signal (60 [MHz]) of the oscillator 19 in compliance with the setting of the 512-color mode. In short, the operation of switching the clock signals and the operation of switching the number of colors to-be-developed can be controlled in interlocked fashion. Therefore, the oscillator 19 and the 4096-color mode are not simultaneously selected. In a case where they are simultaneously selected, the flickering of the FRC display arises to degrade the image quality as stated before. Accordingly, this embodiment can prevent software from erroneously setting information in the hardware architecture so as to form the cause of the degradation of the image quality.

This embodiment has mentioned the mode selector 9 having the construction in which the frequency control circuit 21 is omitted and in which the information of the signal line 24 delivered from the number-of-colors control circuit 22 controls the clock signal selection of the selector circuit 20. The present invention, however, is not restricted to this construction. It is also allowed to employ a construction in which, to the contrary, the number-of-colors control circuit 22 is omitted, thereby controlling the number of colors to-be-developed on the basis of the output information of the frequency control circuit 21. This alteration is not restricted to this embodiment, but it is also applicable to the other embodiments.

Now, the fourth embodiment of the present invention will be described with reference to the drawings.

Figure 15:
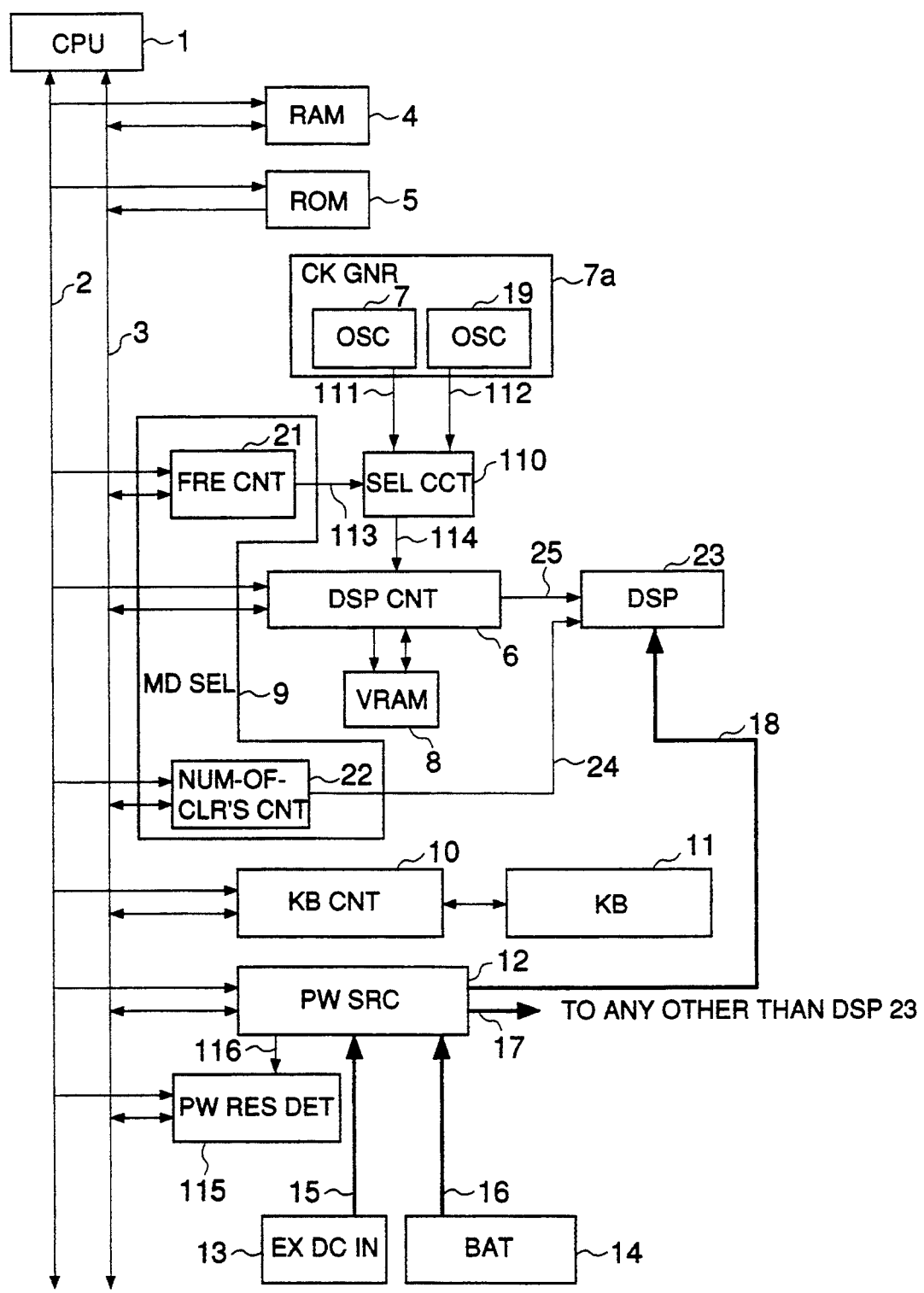
FIG. 15 is a block diagram showing the construction of the fourth embodiment of the information processing equipment of the present invention.

FIG. 15 is a block diagram of an information processing equipment showing the fourth embodiment. In the figure, identical symbols are assigned to constituents having the same functions as those of the constituents shown in FIG. 1.

The points of difference of this embodiment from the embodiment shown in FIG. 1 are that a selector circuit 110 is included for selecting the clock signals of the oscillators 7 and 19, and that the power source section is furnished with a power reserve detector circuit 115 which detects the quantity of electric power remaining in the battery 14. Regarding the other points, this embodiment has the same construction and operations as those of the embodiment shown in FIG. 1. Accordingly, the points of difference shall be chiefly elucidated here without repeated description.

The selector circuit 110 shown in FIG. 15 has the function of preventing the occurrence of hazard in the switching operation of the clock signals. In the figure, numeral 111 denotes a line for the clock signal of the oscillator 7, numeral 112 a line for the clock signal of the oscillator 19, numeral 113 a line for the selection signal delivered from the frequency control circuit 21, numeral 114 a line for the clock signal which is supplied to the display control circuit 6, and numeral 116 a line for a battery use signal.

In switching the clock signals, the hazard could occur. Therefore, the display control circuit 6 might malfunction to destroy the contents of the VRAM 8. Accordingly, the setting of information in the frequency control circuit 21 is allowed only at the start-up of the system, and it is unfavorable to dynamically switch the clock signals in a program which the user utilizes. In order to avoid this drawback, in the fourth embodiment, the selector circuit 110 is constructed so as not to incur the hazard in the switching operation. Thus, the CPU 1 can set the information in the frequency control circuit 21 at any timing. The details of the construction of the selector circuit 110 will be explained later. It is needless to say that the selector circuit 110 employed in this embodiment is applicable also to the other embodiments.

Figure 17:
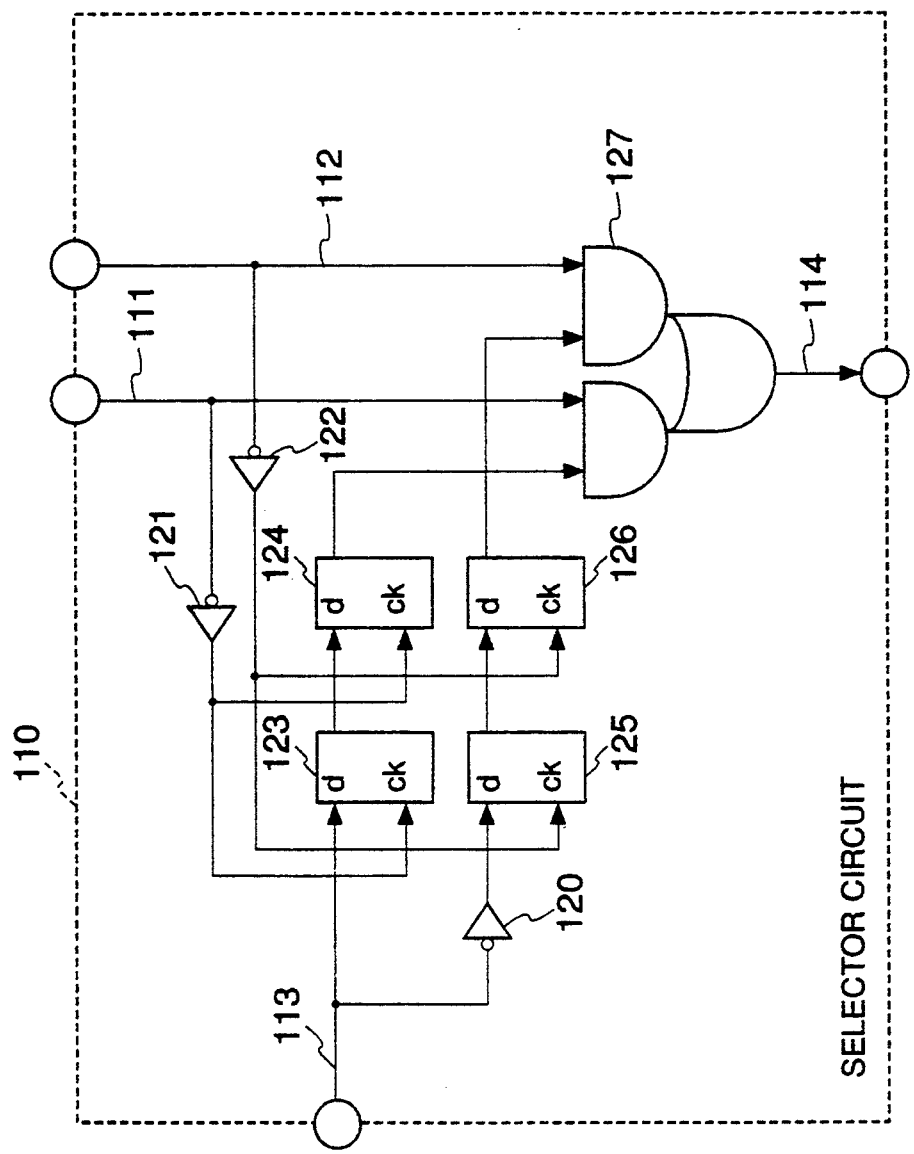
FIG. 17 is a block diagram showing the details of a selector circuit shown in FIG. 15.

FIG. 17 is a block diagram of the selector circuit 110. In the figure, identical numerals are assigned to constituents which have the same functions as those of the constituents shown in FIG. 15.

Referring to FIG. 17, the selector circuit 110 includes inverter circuits 120~122, latch circuits 123~126 each of which has the same function as that of the latch circuit 34 shown in FIG. 5, and an AND-OR circuit 127.

Since the inverter circuit 121 inverts the information of the clock signal line 111, the latch circuits 123 and 124 accept information at the trailing edge of the clock signal of the line 111. Likewise, since the inverter circuit 122 inverts the information of the clock signal line 112, the latch circuits 125 and 126 accept information at the trailing edge of the clock signal of the line 112. Each of the pair of latch circuits 123 and 124 and the pair of latch circuits 125 and 126 has a two-stage latch configuration for synchronization processing. The latch circuit 124 synchronizes the information of the selection signal line 113, and delivers the synchronized information to the AND-OR circuit 127. Likewise, the latch circuit 126 synchronizes the inverted information of the information of the selection signal line 113 as produced by the inverter circuit 120, and it delivers the synchronized information to the AND-OR circuit 127.

In the AND-OR circuit 127, the clock signal of the clock signal line 111 is switched at the trailing edge, so that the hazard does not occur in the clock signal line 114. Likewise, the clock signal of the clock signal line 112 is switched at the trailing edge, so-that the hazard does not occur in the clock signal line 114.

Thus, according to this embodiment, the selector circuit 110 capable of preventing the occurrence of the hazard can be constructed of the simple circuit arrangement.

In addition, the power reserve detector circuit 115 can detect the electric power remaining in the battery 14. The CPU 1 reads the information of detection, thereby monitoring the quantity of the electric power reserved in the battery 14. Upon recognizing that the power reserve has decreased down to a specified quantity, the CPU 1 can set the selection information in the number-of-colors control circuit 22 and the frequency control circuit 21 so as to establish the lower power operation in the 512-color mode. Owing to the incorporation of the above function into the system program residing in the RAM 4, when the power reserve of the battery 14 has become little, the operating mode shifts automatically to the lower power dissipation mode without the user's concern, and the longer operable time period can be secured.

Figure 18:
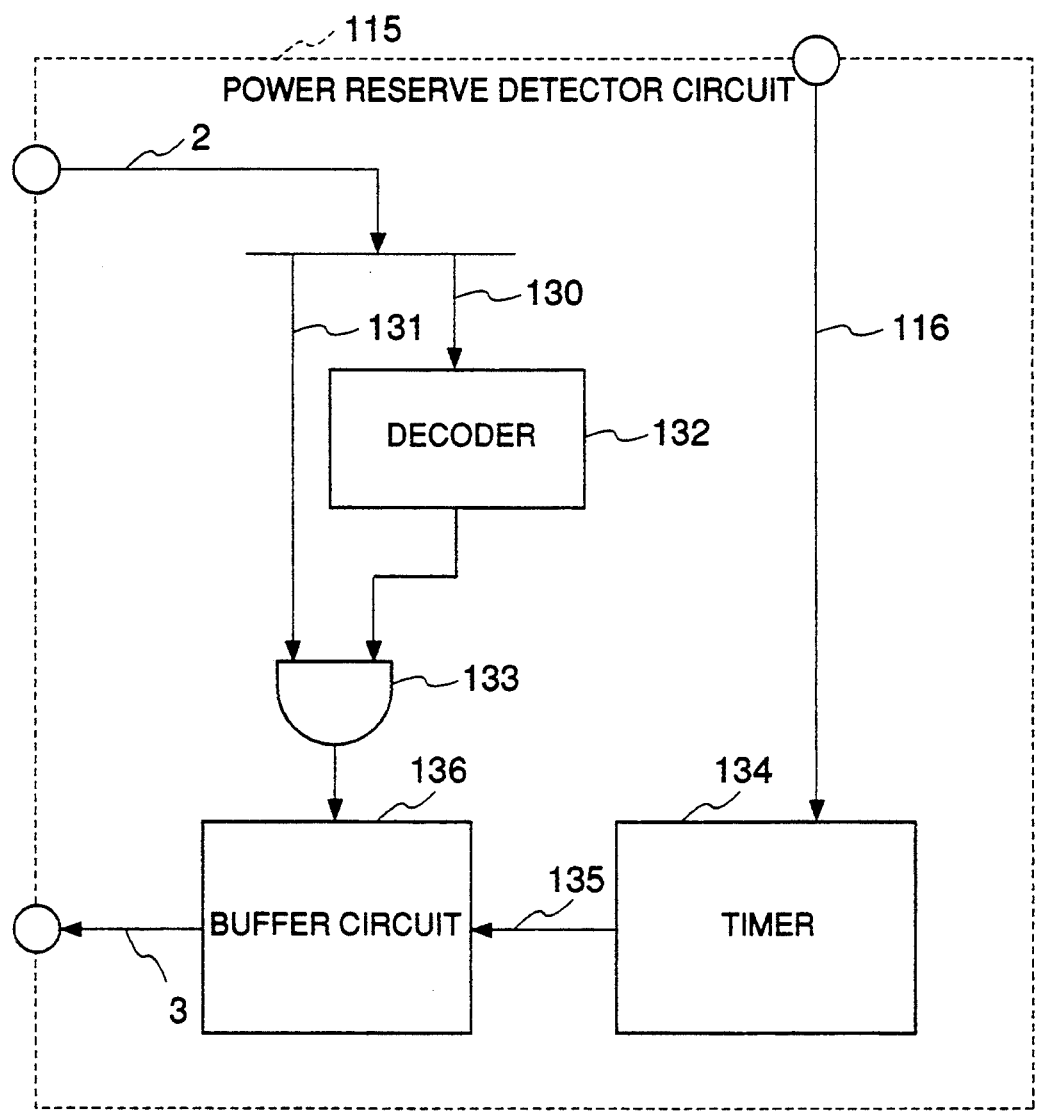
FIG. 18 is a block diagram showing the details of a power reserve detector circuit shown in FIG. 15.

FIG. 18 is a block diagram of the power reserve detector circuit 115. In the figure, identical numerals are assigned to constituents which have the same functions as those of the constituents shown in FIG. 15.

Referring to FIG. 18, the power reserve detector circuit 115 includes a decoder circuit 132, an AND circuit 133, a timer 134 for timekeeping, and a buffer circuit 136. In the figure, numeral 130 denotes an address line, numeral 131 a validity signal line, and numeral 135 a signal line to which the timer 134 delivers time information. Besides, the address bus 2 is configured of the address line 130 and the validity signal line 131 in the same manner as in the number-of-colors control circuit 22 shown in FIG. 5.

The timer 134 receives the information of the battery use signal line 116. Thus, it can detect the period (discharge period) for which the battery 14 is feeding the electric power, and the period (charge period) for which the battery 14 is being fed with the electric power. The timer 134 counts up the time information during the charge period, and counts it down during the discharge period. Accordingly, the time information of the timer 134 being great signifies that the quantity of the electric power remaining in the battery 14 is large. Here, an upper-limit value is set for the information of the timer 134 beforehand. The upper-limit value is determined supposing the state in which the battery 14 is charged to its full capacity. This state can be found by, for example, a previous experiment or calculation.

The decoder circuit 132 supplies the AND circuit 133 with an address-signal allotted to the buffer circuit 136. The AND circuit 133 notifies the buffer circuit 136 that the address line 130 indicates the address of the buffer circuit 136, and that the validity signal line 131 indicates a valid read cycle. At this time, the buffer circuit 136 delivers the information of the digital output line 135 to the data bus 3. In contrast, the buffer circuit 136 exhibits a high impedance to the data bus 3 at any other time. Owing to such a read operation, the CPU 1 can accept the time information of the timer 134, in other words, the power reserve information of the battery 14.

The power reserve detector circuit 115 can be realized by the construction stated above.

According to the fourth embodiment, when the quantity of electric power remaining in the battery 14 has become small, the equipment shifts automatically to the lower power dissipation mode without the user's concern, and the longer operable time period can be secured. Here, the automatic shift to the lower power dissipation mode can be effected by comparatively simple software as shown in FIG. 16 by way of example.

Figure 16:
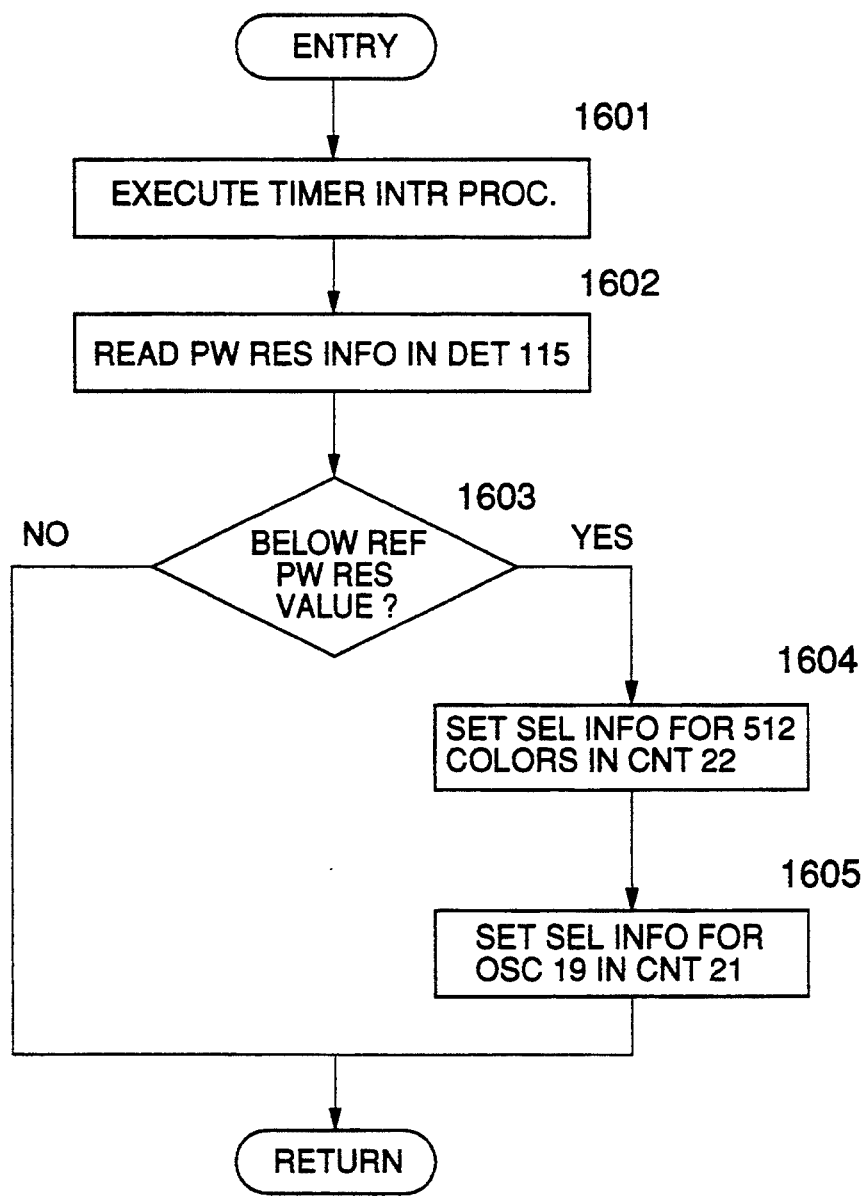
FIG. 16 is a flow chart showing the operating steps of that function of selecting an automatic mode which is employed in the fourth embodiment.

FIG. 16 shows a flow chart in the case where the exemplified program is incorporated in a timer interrupt routine.

In response to a predetermined timer interrupt, the CPU 1 executes corresponding interrupt processing (step 1601). Subsequently, the CPU 1 reads the power reserve information in the power-reserve detector circuit 115 (step 1602). The read power reserve information is compared with the predetermined power reserve value set as a reference beforehand (step 1603). In a case where the read power reserve information is below the predetermined power reserve value, the CPU 1 sets the selection information for the 512 colors in the number-of-colors control circuit 22 (step 1604). Next, the CPU 1 sets the selection information for the oscillator 19 in the frequency control circuit 21 (step 1605). On the other hand, in a case where the read power reserve information is not below the predetermined power reserve value, the CPU 1 allows the ordinary mode to continue as it is.

Here, the predetermined power reserve value is set, for example, in such a way that the relationship between the power reserve quantity and the count value of the time information in an assumed condition, in which the electric power is fed from the battery 14 to all the loads of the equipment, is experimentally or calculatively found in advance. Incidentally, it may well be set on the basis of the electric power fed to the principal loads of the equipment, not to all the loads.

Although this embodiment has mentioned the example in which the power reserve of the battery 14 is detected by checking the charge period and the discharge period, the present invention is not restricted thereto. By way of example, the power reserve detector circuit 115 may well include circuits which measure a charging current and a discharging current, respectively, and a circuit which integrates the results of the measured currents, thereby evaluating the power reserve of the batter 14. Alternatively, in a case where a battery the terminal voltage of which lowers with decrease in the power reserve thereof is employed as the battery 14, a similar mode selection control can be performed by monitoring the terminal voltage of the battery 14.

Figure 23:
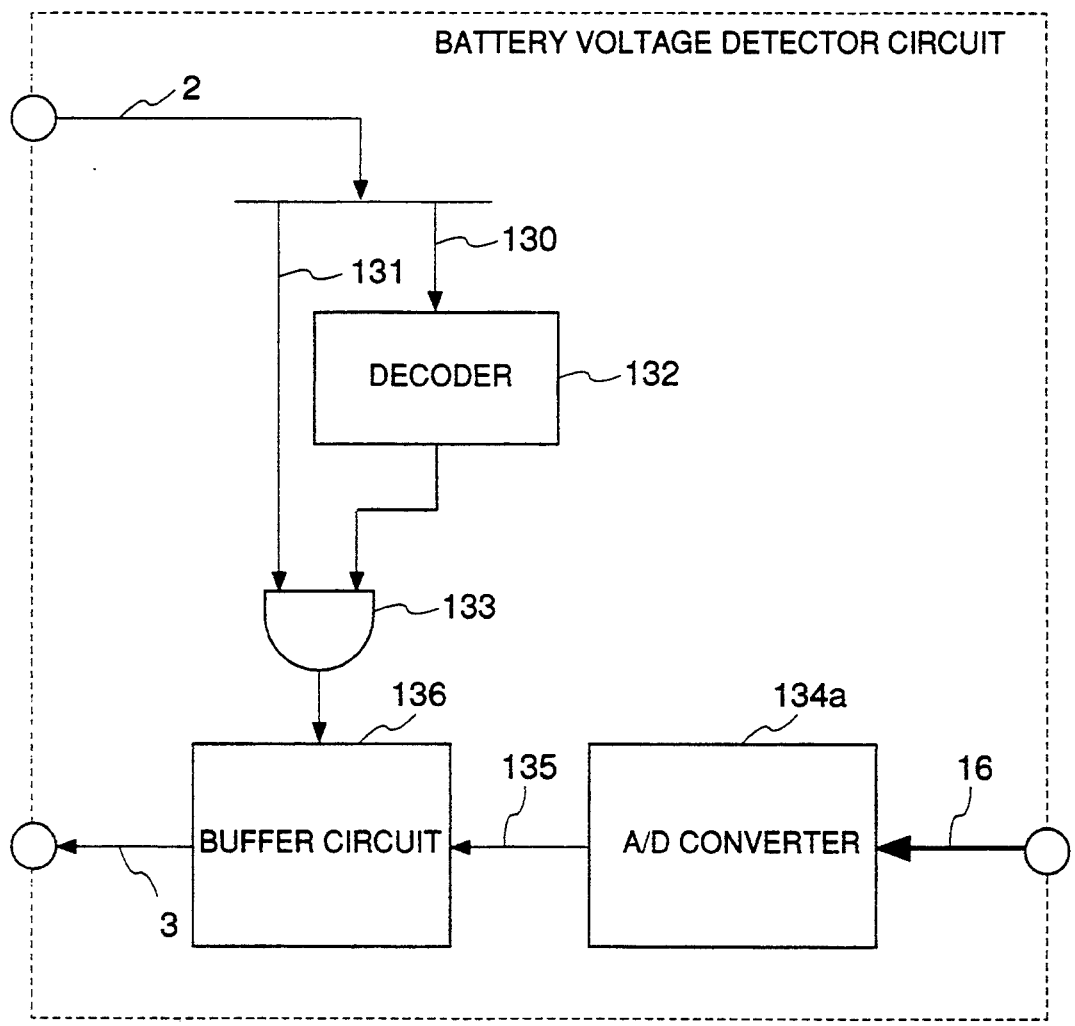
FIG. 23 is a block diagram showing an example of a voltage detector circuit which detects the terminal voltage of a battery.

FIG. 23 shows an example of the construction of a voltage detector circuit in the latter case employing the battery of the specified type. The voltage detector circuit illustrated in the figure is such that the timer 134 in the power reserve detector circuit 115 shown in FIG. 18 is replaced with an A/D (analog-to-digital) conversion circuit 134a, which accepts the voltage of the feeder line 16 of the battery 14 so as to detect the terminal voltage of this battery. In this case, the flow chart shown in FIG. 16 may have the contents of the steps 1602 and 1603 altered so as to read the voltage level of the feeder line 16 at the step 1602 and to compare the read voltage value with a predetermined voltage level set as a reference beforehand, at the step 1603.

Now, the fifth embodiment of the present invention will be described with reference to the drawings.

Figure 19:
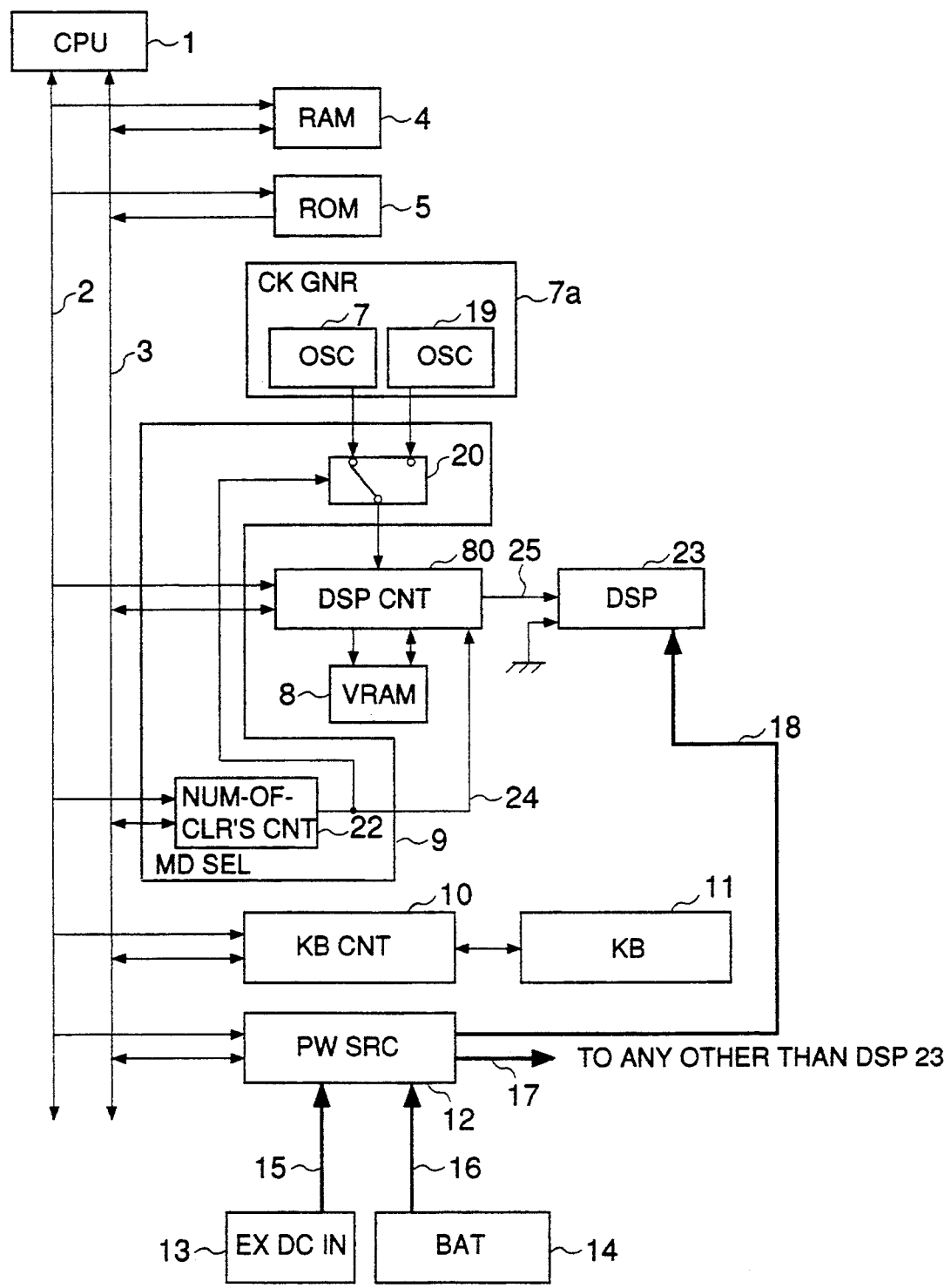
FIG. 19 is a block diagram showing the construction of the fifth embodiment of the information processing equipment of the present invention.

FIG. 19 is a block diagram of an information processing equipment illustrative of the fifth embodiment. In the figure, identical symbols are assigned to constituents which have the same functions as those of the constituents shown in FIGS. 10 and 14.

This embodiment selects the number of colors to-be-developed in the display control circuit 80 as in the second embodiment. The point of difference of this embodiment from the second embodiment is that the information of the signal line 24 delivered from the number-of-colors control circuit 22 is used as the selection information of the selector circuit 20. Thus, likewise to the third embodiment, this embodiment can prevent software from erroneously setting information in the hardware architecture so as to form the cause of the degradation of the image quality. Since the other construction is the same as in the second and third embodiments, it shall be omitted from description here.

Now, the sixth embodiment of the present invention will be described with reference to the drawings.

Figure 20:
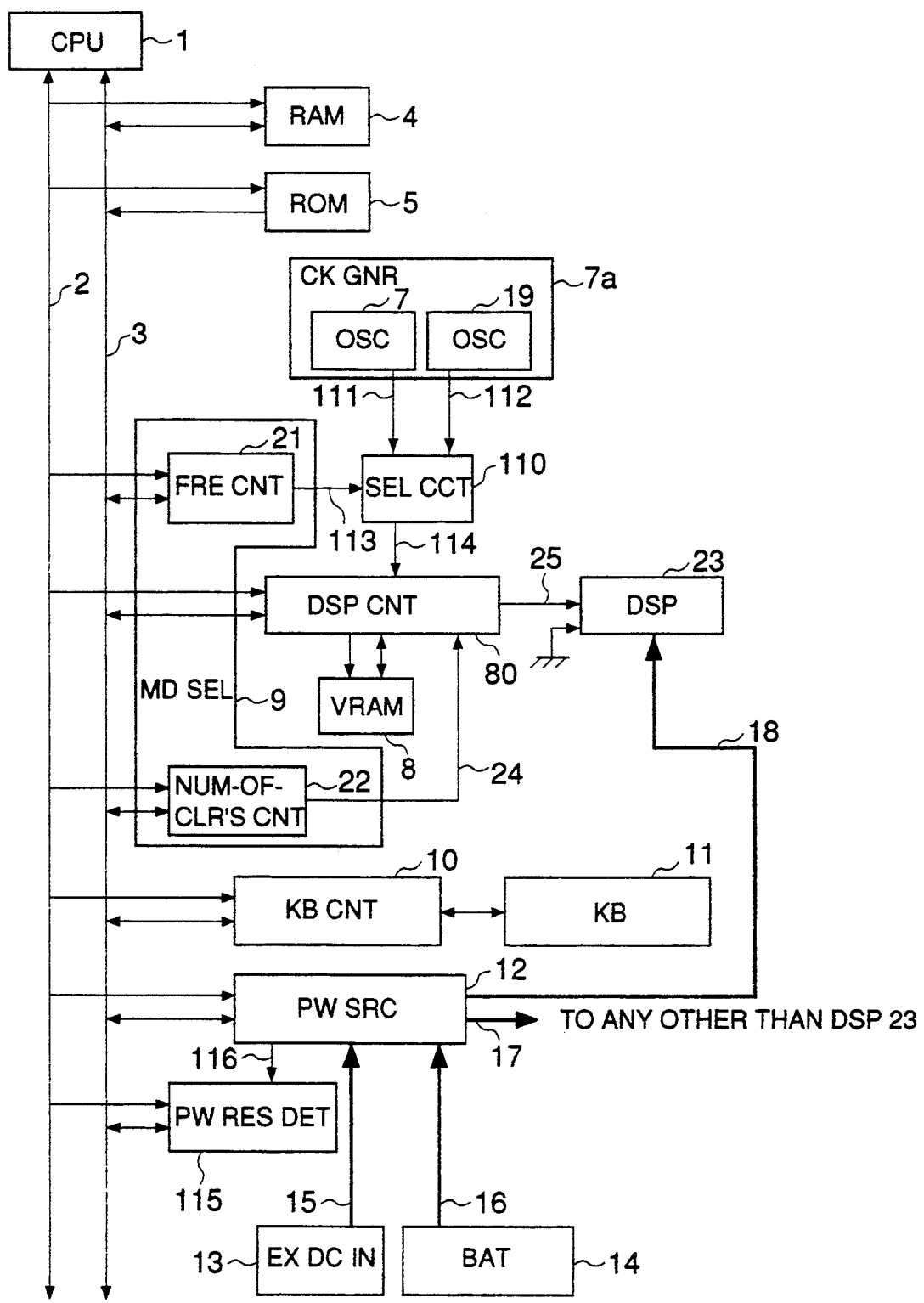
FIG. 20 is a block diagram showing the construction of the sixth embodiment of the information processing equipment of the present invention.

FIG. 20 is a block diagram of an information processing equipment illustrative of the sixth embodiment. In the figure, identical symbols are assigned to constituents which have the same functions as those of the constituents shown in FIGS. 10 and 15.

This embodiment selects the number of colors to-be-developed in the display control Circuit 80 as in the second embodiment. Besides, likewise to the fourth embodiment, this embodiment includes the selector circuit 110 endowed with the hazard preventing function, and the power reserve detector circuit 115.

Likewise to the fourth embodiment, this embodiment undergoes no hazard in the switching operation in the selector circuit 110. Therefore, the CPU 1 in this embodiment can set the selection information in the frequency control circuit 21 at any timing.

In addition, the power reserve detector circuit 115 can detect the quantity of electric power remaining in the battery 14. The CPU 1 regularly monitors the power reserve of the battery 14 through the power reserve detector circuit 115. Upon recognizing that the power reserve has decreased down to the specified level, the CPU 1 can set the selection information in the number-of-colors control circuit 22 and the frequency control circuit 21 so as to establish the lower power operation in the 512-color mode. Owing to the incorporation of the above function into the system program residing in the RAM 4, when the power reserve of the battery 14 has become little, the operating mode shifts automatically to the lower power dissipation mode without the user's concern, and the longer operable time period can be secured.

Now, the seventh embodiment of the present invention will be described with reference to the drawings.

Figure 21:
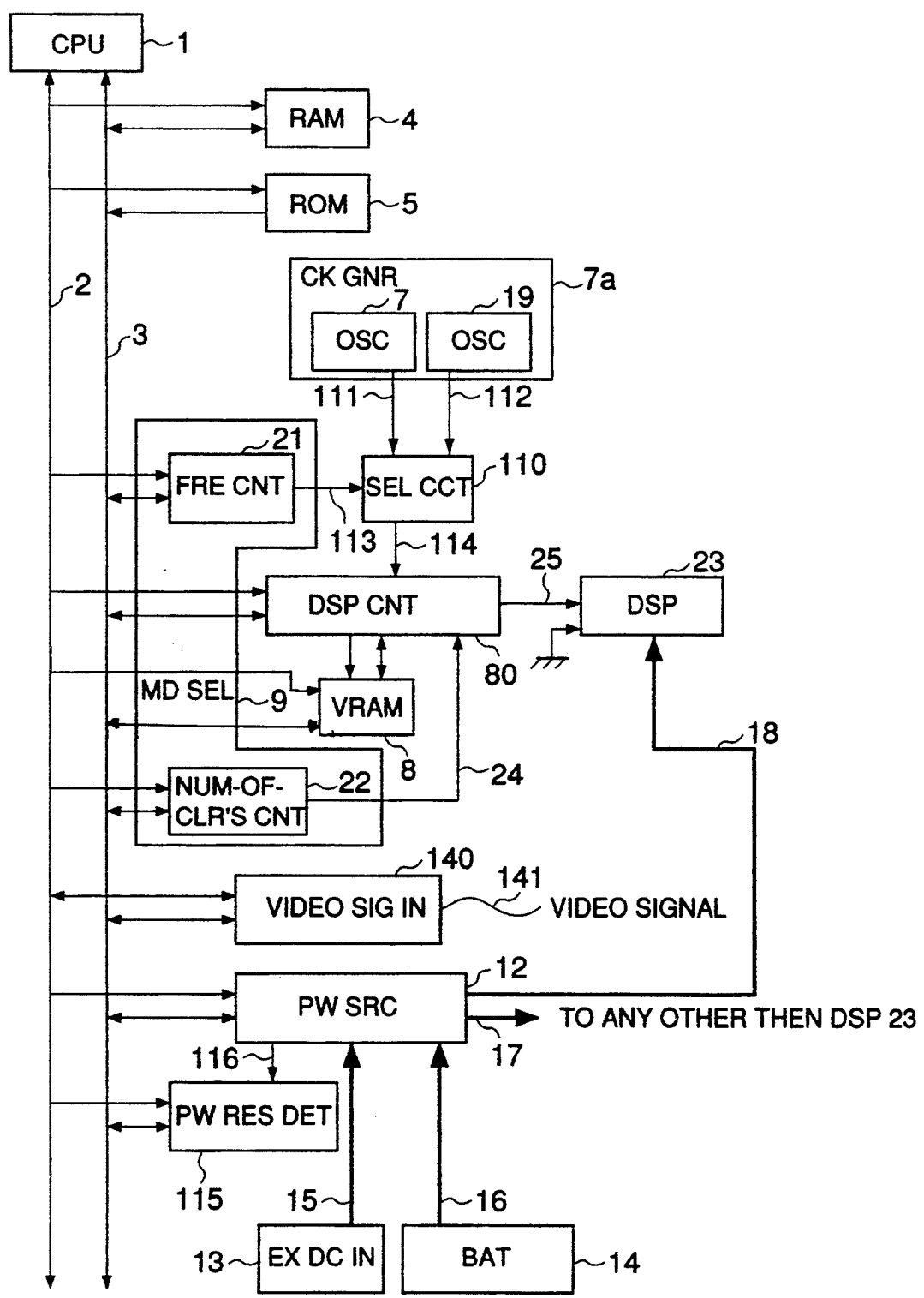
FIG. 21 is a block diagram showing the construction of the seventh embodiment of the information processing equipment of the present invention.

FIG. 21 is a block diagram of an image processing equipment illustrative of the seventh embodiment. In the figure, identical symbols are assigned to constituents which have the same functions as those of the constituents shown in FIG. 20. This embodiment is constructed similarly to the embodiment shown in FIG. 20, except that a video signal input circuit 140 is included. Incidentally, the keyboard controller 10 and the keyboard 11 are omitted from the illustration in FIG. 21. However, they may well be omitted from the actual construction of the equipment. Concretely, the equipment can be constructed as an image playback equipment.

The video signal input circuit 140 accepts the input of a video signal (in any of the NTSC TV system, the PAL TV system, etc.) 141 from, for example, a video tape recorder, a television tuner or a video disk player. Then, it transfers the video information of the video signal 141 to the VRAM 8. In order to execute real time processing on this occasion, the video signal input circuit 140 is endowed with the function of delivering address information to the address bus 2 so as to transfer the video information to the VRAM 8 directly without the intervention of the CPU 1. The video information transferred to the VRAM 8 is delivered to the display unit 23 by the display control circuit 80. Thus, the video information of the video signal 141 can be displayed on the screen of the display unit 23.

Also in this embodiment, as in the preceding embodiment in FIG. 20, the power reserve detector circuit 115 detects the quantity of electric power remaining in the battery 14. The CPU 1 monitors the power reserve of the battery 14 through the power reserve detector circuit 115. When the power reserve of the battery 14 has become below the predetermined value, the CPU 1 switches the operating mode to the lower-power mode as stated before. Thus, the playback time period of the video signal in the battery operation can be kept longer.

Now, the eighth embodiment of the present invention will be described with reference to the drawings.

Figure 22:
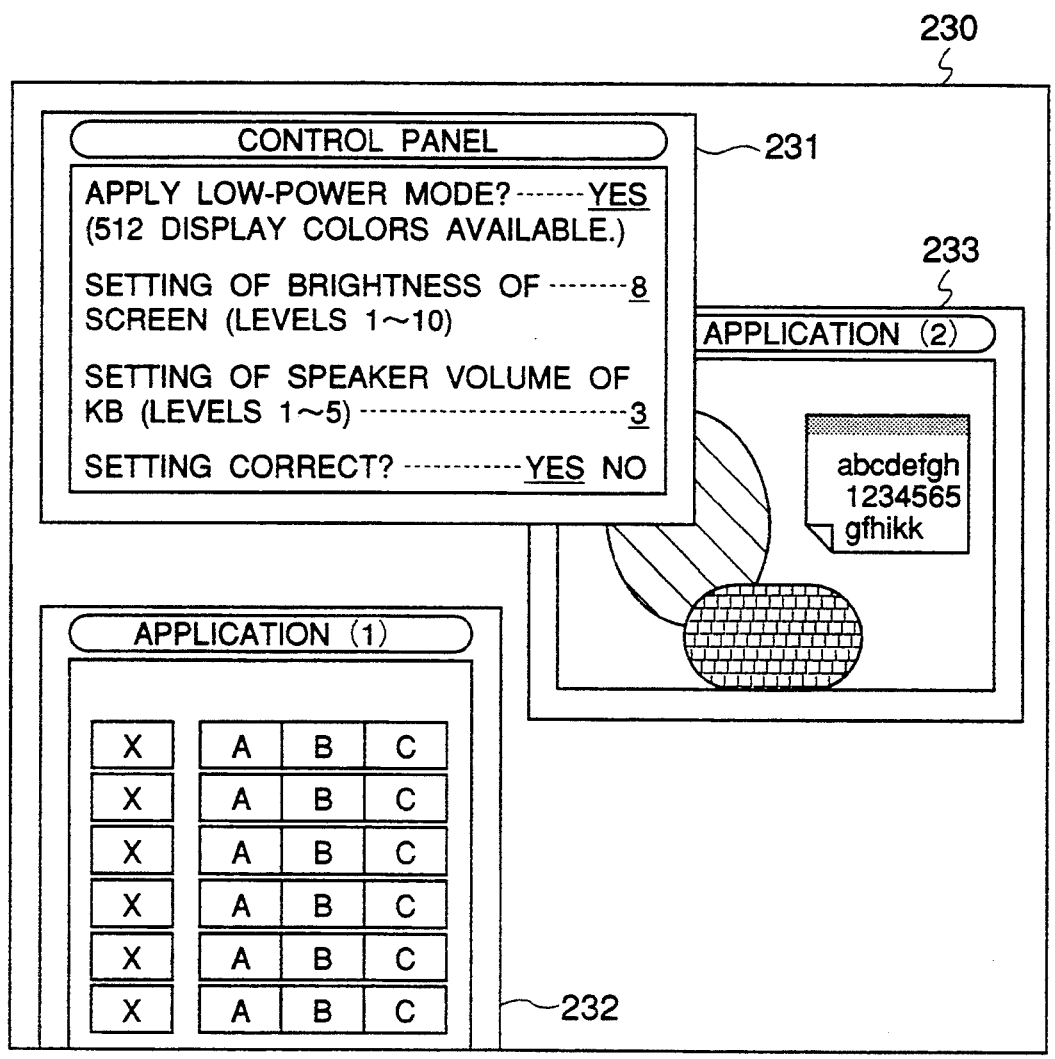
FIG. 22 is an explanatory diagram showing an example of a display image for guiding operations which are performed in the eighth embodiment of the information processing equipment of the present invention.

FIG. 22 shows an example of a display image for guiding operations which are performed in the eighth embodiment. An information processing equipment in this embodiment is applicable to any of the embodiments described before and the embodiments to be described later. Although the hardware architecture of this embodiment is not especially illustrated, a case of employing the hardware architecture shown in FIG. 1 shall be supposed in the description here.

As shown in FIG. 22, this embodiment has a multi-window function. In the figure, the three windows of a control panel 231, an application (1) 232 and an application (2) 233 are opened in the screen 230 of the display unit 23 by the CPU 1.

Usually, the control panel 231 serves to set, for example, the brightness of the screen of the display unit 23, and the sound volume of warnings against a mistouch on the keyboard 11, etc. In this embodiment, an area for setting the lower power dissipation mode is additionally defined in the control panel 231.

Thus, the user of the equipment can manually set the mode with ease. Besides, even when any application is under execution, the modes can be switched by opening the control panel 231.

Moreover, the control panel 231 can be formed with an area for instructing the CPU 1 to inhibit the automatic mode switching function.

By the way, in this embodiment, the input means may well be further furnished with a position designating device such as mouse.

Now, the ninth embodiment will be described with reference to the drawings.

Figure 24:
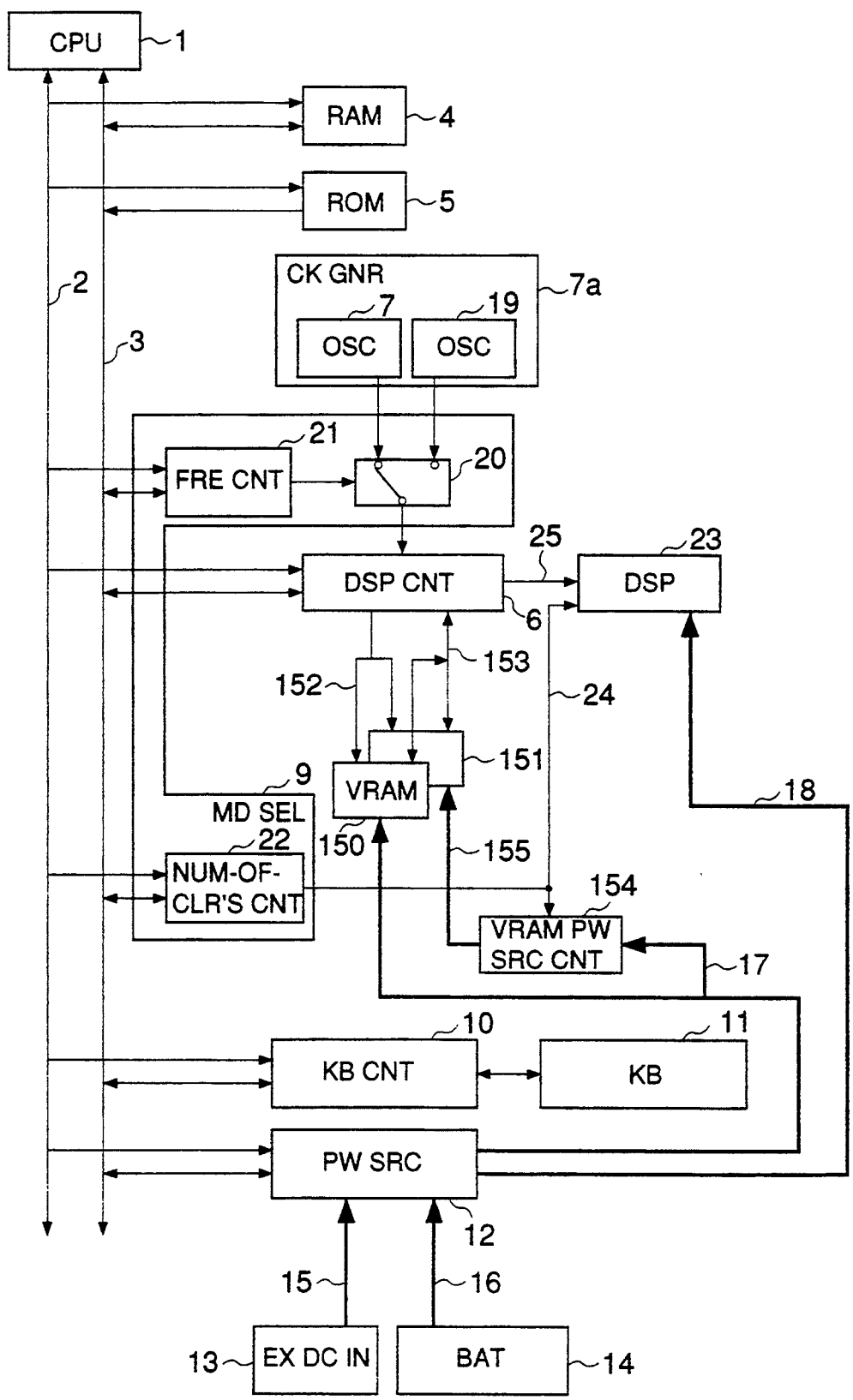
FIG. 24 is a block diagram showing the construction of the ninth embodiment of the information processing equipment of the present invention.

FIG. 24 is a block diagram of an information processing equipment illustrative of the ninth embodiment. In the figure, identical symbols are assigned to constituents which have the same functions as those of the constituents shown in FIG. 1.

This embodiment differs from the first embodiment in that the VRAM 8 is substituted by a 2-block configuration consisting of a VRAM 150 and a VRAM 151 to which individual power source lines 17 and 155 are respectively connected, and that a VRAM power source control circuit 154 which controls the feed of electric power to the VRAM 151 is included. Accordingly, the points of difference shall be chiefly elucidated here without repeated description.

The VRAM 150 shown in FIG. 24 has a memory capacity which is required for the N-color display explained in the first embodiment. On the other hand, the VRAM 151 has a memory capacity which realizes the display in the (N+M) colors when this memory 151 is used conjointly with the VRAM 150. The VRAM's 150 and 151 transfer display information to and from the display control circuit 6 through common signal lines. These common-signal lines consist of a signal line 152 for transferring address information and control information, and a signal line 153 for transferring data.

In addition, the VRAM 150 is fed with electric power through the feeder line 17 from the power source circuit 12. In contrast, the VRAM 151 is fed with the electric power through the feeder line 155 from the VRAM power source control circuit 154. Herein, the VRAM power source control circuit 154 controls the feed of electric power to the VRAM 151 in accordance with the selection information of the signal line 24. This circuit 154 cuts off the electric power when the information of the signal line 24 indicates the N-color mode, whereas it feeds the electric power when the information indicates the (N+M)-color mode. Such a VRAM power source control circuit 154 can be readily realized by utilizing a relay circuit.

In the case of operating the equipment in the N-color mode, accordingly, the power dissipation of the VRAM 151 is null, and the power dissipation of the equipment can be reduced.

The detailed constructions of the VRAM's 150 and 151 will now be explained with reference to the drawings. In particular, there will be exemplified a case where the resolution of the display panel of the display unit 23 is 800×600 [dots], where the number N of colors to-be-developed is 512 and where the number (N+M) of colors to-be-developed is 4096.

Figure 25:
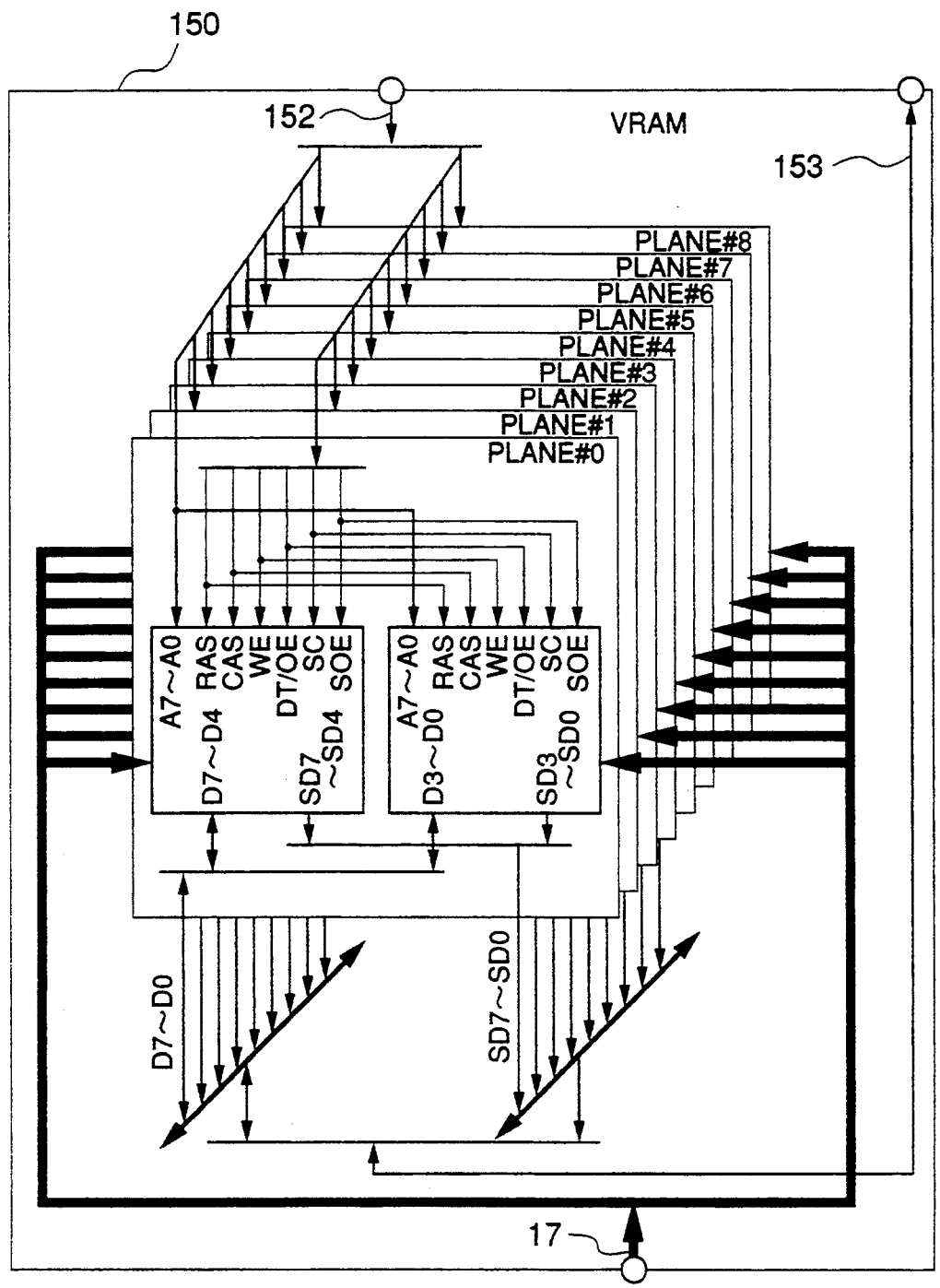
FIG. 25 is a block diagram showing the construction of a VRAM (video random access memory) which is employed in the ninth embodiment.

FIG. 25 is a block diagram showing the details of the VRAM 150. In the figure, identical numerals are assigned to constituents which have the same functions as those of the constituents shown in FIG. 24. The VRAM 150 employed here is a product "HM53461 SERIES" manufactured by Hitachi, Ltd., in which a memory device has a construction of 64k [words]×4 [bits]. Using two such memory devices, binary display information can be stored at the resolution of 800×600 [dots]. The binary display information is defined as "one plane".

In order to store the display information of the 512 colors at the resolution of 800×600 [dots] in conformity with the definition, the VRAM 150 is configured of 9 planes (planes #0~#8 in FIG. 25). The address information (A7~A0) and the six sorts of control information, such as RAS (row address strobe) signals and CAS (column address strobe) signals, which are directed toward the respective memory devices, are supplied through the signal line 152. Besides, the two memory devices within each plane can have 8-bit data bus structures (D7~D0 and SD7~SD0, respectively) as shown in the figure. The display information are transferred through the signal line 153 thus constructed. The VRAM 150 which realizes the 512-color display at the resolution of 800×600 [dots] can be constructed in this way.

Figure 26:
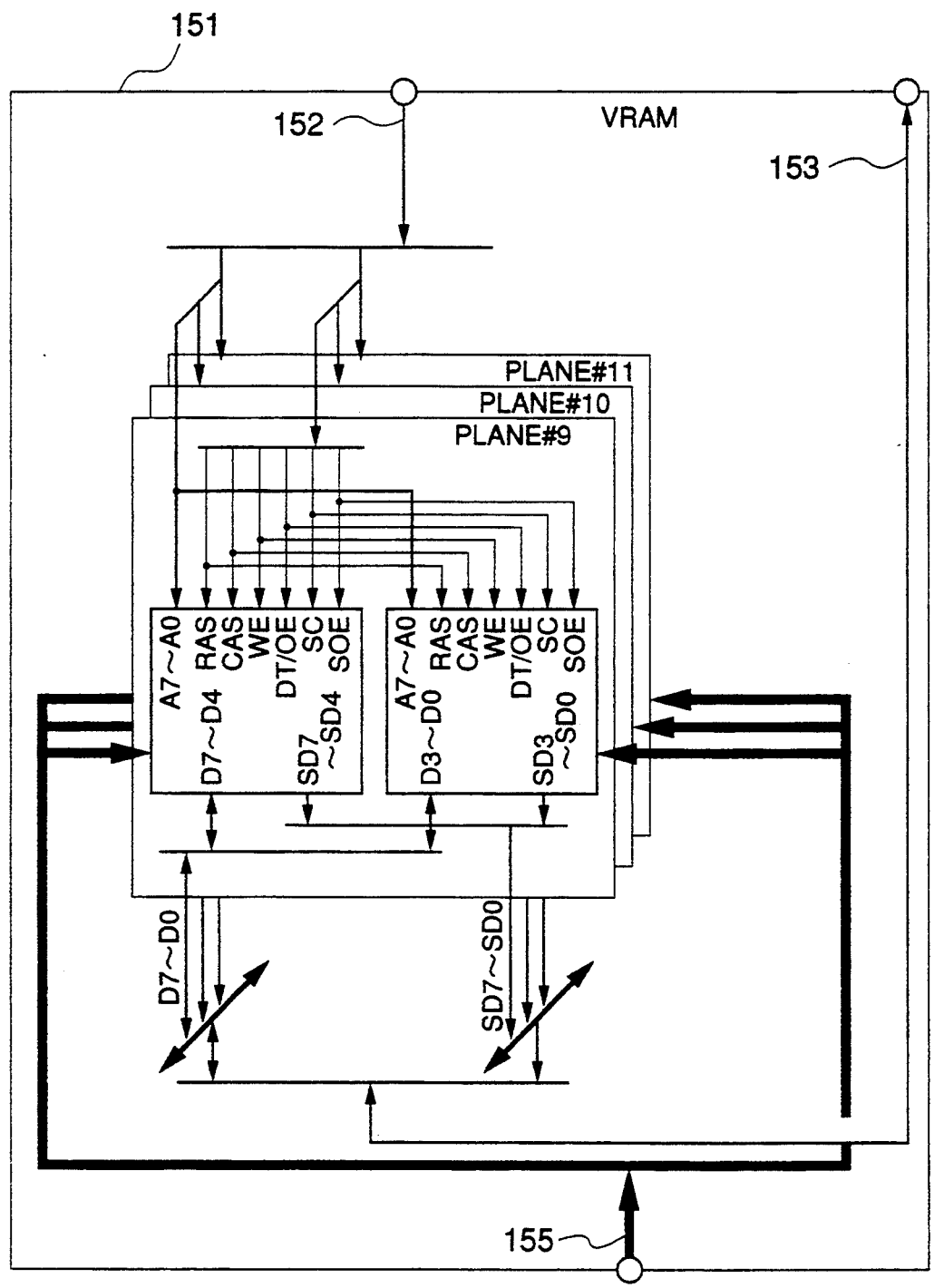
FIG. 26 is a block diagram showing the construction of another VRAM which is employed in the ninth embodiment.

Likewise, FIG. 26 is a block diagram showing the details of the VRAM 151. In the figure, identical numerals are assigned to constituents which have the same functions as those of the constituents shown in FIG. 24. The VRAM 151 is basically the same in construction as the VRAM 150, except that it includes three planes (planes #9~#11). When this VRAM 151 is used conjointly with the VRAM 150, the display information capable of displaying the 4096 colors at the resolution of 800×600 [dots] can be stored.

As described above, according to this embodiment, when the mode of the 512 colors is selected and applied, the power dissipation of the VRAM 151 can be made null in addition to the effects of the first embodiment. It is therefore possible to reduce the power dissipation of the equipment and to lengthen the battery operable time period.

Now, the tenth embodiment will be described with reference to the drawings.

Figure 27:
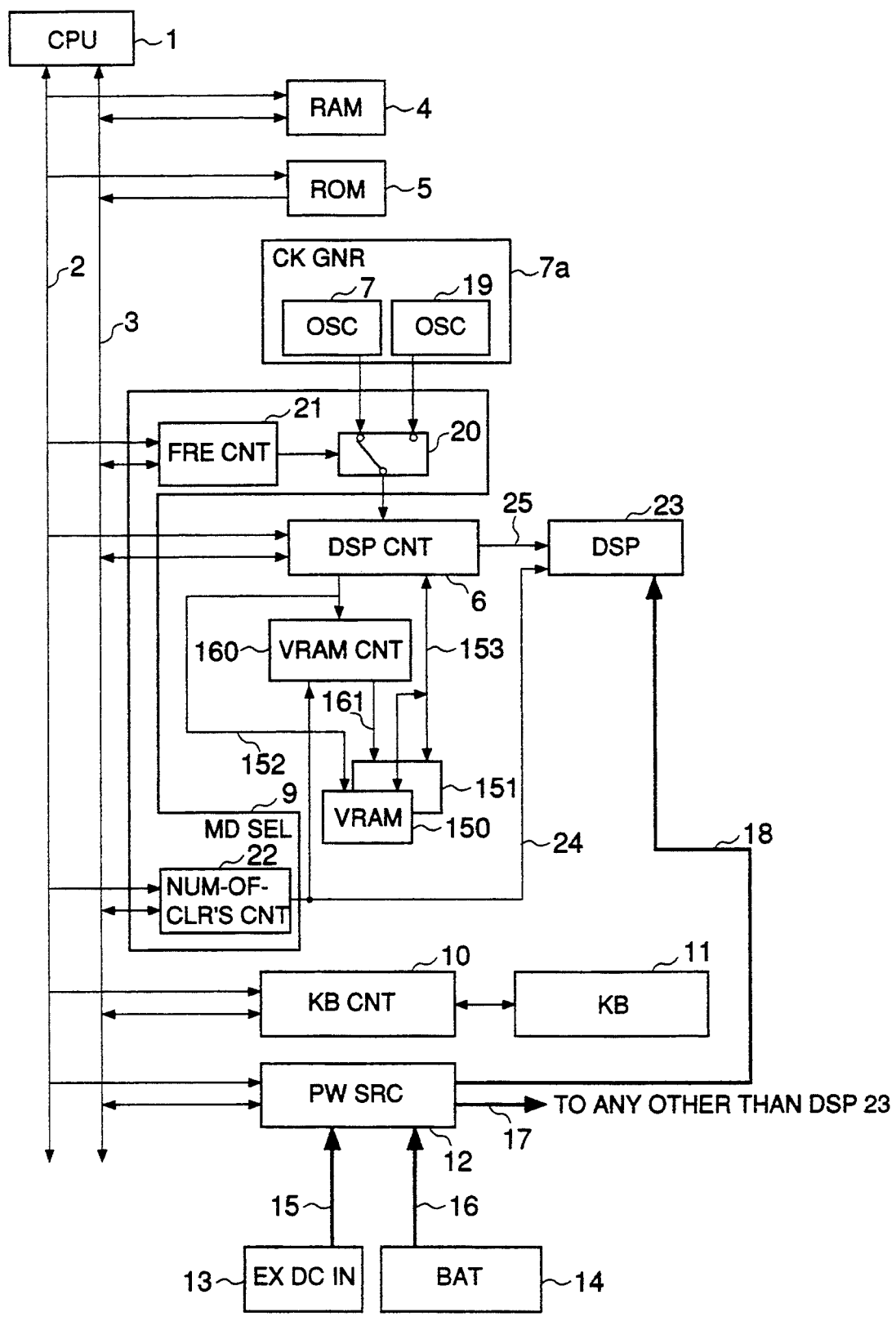
FIG. 27 is a block diagram showing the construction of the tenth embodiment of the information processing equipment of the present invention.

FIG. 27 is a block diagram of an information processing equipment illustrative of the tenth embodiment. In the figure, identical symbols are assigned to constituents which have the same functions as those of the constituents shown in FIG. 24.

The tenth embodiment differs from the ninth embodiment in that the VRAM power source control circuit 154 is omitted to feed both the VRAM's 150 and 151 with electric power through the power source line 17 from the power source circuit 12, and that a VRAM control circuit 160 is included anew. It is the same as in the ninth embodiment that, as the effect of the tenth embodiment, the power dissipation of the VRAM 151 is made lower in the case of selecting the N-color mode. Accordingly, the points of difference shall be chiefly elucidated here without repeated description.

The VRAM control circuit 160 shown in FIG. 27 has the function of masking the address information and control information of the signal line 152. Concretely, in the case where the selection information of the signal line 24 indicates the mode of the (N+M) colors, the VRAM control circuit 160 delivers the address information and control information of the signal line 152 to a signal line 161 as they are. In contrast, in the case where the selection information of the signal line 24 indicates the mode of the N colors, the VRAM control circuit 160 masks the address information and control information of the signal line 152. Thus, the signals of the signal line 161 come to have a fixed level, and all the memory devices included in the VRAM 151 fall into standby states.

The power dissipation of the memory device is considerably low in the standby state. As a practicable example, in the case of the product "HM53461 SERIES" manufactured by Hitachi, Ltd., the power dissipation per memory device is at most 40 [mW] in the standby state whereas it is at most 600 [mW] in the ordinary operation. In this manner, the power dissipation can be suppressed to a value which is, at least, one order smaller, so that the effect of lowering the power dissipation is great.

The detailed construction of the VRAM control circuit 160 will now be explained with reference to the drawings.

Figure 28:
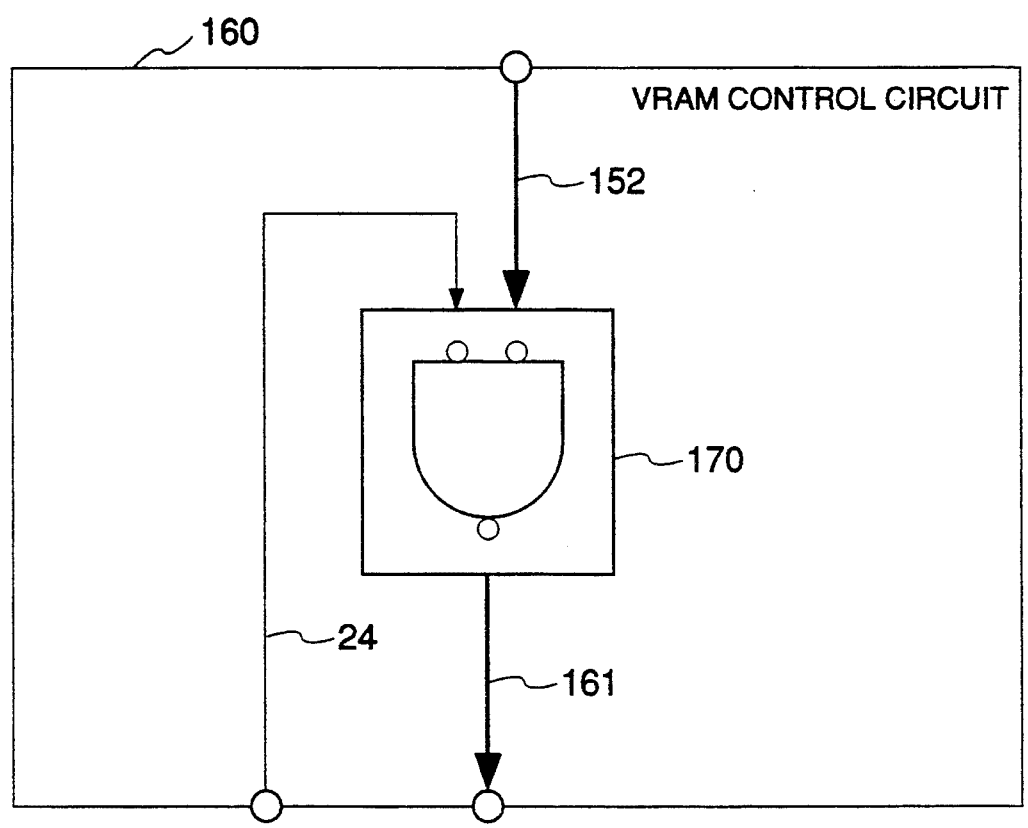
FIG. 28 is a block diagram showing the detailed construction of a VRAM control circuit which is employed in the tenth embodiment.

FIG. 28 is a block diagram showing the details of the VRAM control circuit 160. In the figure, identical numerals are assigned to constituents which have the same functions as those of the constituents shown in FIG. 27. Numeral 170 in FIG. 28 denotes a logical circuit, which supplies the signal line 161 with the logical information between the information of the signal line 152 and the information of the signal line 24.

The information of the signal line 24 has the signal level of "1" in the case of indicating the mode of the N colors, while it has the signal level of "0" in the case of indicating the mode of the (N+M) colors. In the N-color mode, accordingly, the levels of all the signals of the signal line 161 become "1", and all the memory devices connected to the signal line 161 fall into the standby states. To the contrary, in the (N+M)-color mode, the information of the signal line 152 can be delivered to the signal line 161 with their signal levels left intact. In this manner, the VRAM control circuit 160 can bring the VRAM 151 into the standby state in the N-color mode and into the state of the ordinary operation in the (N+M)-color mode.

As described above, according to this embodiment, when the mode of the N colors is selected and applied, the power dissipation of the VRAM 151 can be expected to decrease, at least, one order by way of example, in addition to the effects of the first embodiment. It is therefore possible to reduce the power dissipation of the equipment and to lengthen the battery operable time period.

Although, in the foregoing embodiments, the display unit has been exemplified as being made of liquid crystal, the present invention is not restricted thereto. The invention is extensively applicable to any display unit in which the number of colors to-be-displayed is changed by altering a clock frequency.

What is claimed is:

1. An information processing equipment capable of multicolor display, comprising:
    a CPU (central processing unit);
    a display memory which stores display information therein;
    a display unit which displays the display information in multiple colors from a predetermined number of colors to-be-developed;
    a display control circuit which controls transfer of information between said CPU and said display memory, and which regularly reads out said display information stored in said display memory and then sends the read-out display information to said display unit;
    a mode selector which selects one of at least two modes consisting of a first mode and a second mode, and which produces selection information,
    said first mode causing said display unit to develop a smaller number of said multiple colors and to operate at a lower frequency,
    said second mode causing said display unit to develop a larger number of said multiple colors and to operate at a higher frequency;
    a clock signal generator which generates a plurality of clock signals of unequal frequencies;
    a clock selector circuit which receives said selection information to select the clock signal of the frequency corresponding to the mode indicated by said selection information, from among said plurality of clock signals delivered from said clock signal generator, and which delivers the selected clock signal to, at least, said display control circuit; and maximum-number-of-colors selection means for receiving said selection information to select the maximum number of colors to-be-developed which are to be displayed by said display unit, in correspondence with said mode indicated by said selection information;

said CPU including means for commanding said mode selector to select said one of said modes.

2. An information processing equipment as defined in claim 1, wherein said clock selector circuit includes a switching circuit which is endowed with a hazard preventing function of synchronizing the clock signal selected currently and the clock signal selected anew and then switching the synchronized clock signals, in the case of selecting said clock signal.

3. An information processing equipment as defined in claim 2, further comprising:

a battery which supplies electric power, and a power reserve detector circuit which detects a quantity of electric power remaining in said battery;

said CPU monitoring a detected result of said power reserve detector circuit, and commanding said mode selector to select said first mode when the remaining power quantity of said battery has become lower than a preset power reserve value.

4. An information processing equipment as defined in claim 3, further comprising:

an input device through which a user of said equipment can give an instruction;

said CPU being capable of accepting the instruction from said input device so as to afford the mode selection command.

5. An information processing equipment as defined in claim 4, wherein said CPU further includes means for generating a controlling window in a screen of said display unit and displaying an area for the mode selection on said window so as to accept the selecting instruction of said user.

6. An information processing equipment as defined in claim 1, further comprising:

a battery which supplies electric power, and a power reserve detector circuit which detects a quantity of the electric power remaining in said battery;

said CPU monitoring a detected result of said power reserve detector circuit, and commanding said mode selector to select said first mode when the remaining power quantity of said battery has become lower than a preset power reserve value.

7. An information processing equipment as defined in claim 6, further comprising:

an input device through which a user of said equipment can give an instruction;

said CPU being capable of accepting the instruction from said input device so as to afford the mode selection command.

8. An information processing equipment as defined in claim 7, wherein said CPU further includes means for generating a controlling window on a screen of said display unit and displaying an area for the mode selection on said window so as to accept the selecting instruction of said user.

9. An information processing equipment as defined in claim 1, further comprising:

an input device through which a user of said equipment can give an instruction;

said CPU being capable of accepting the instruction from said input device so as to afford the mode selection command.

10. An information processing equipment as defined in claim 9, wherein said CPU further includes means for generating a controlling window in a screen of said display unit and displaying an area for the mode selection on said window so as to accept the selecting instruction of said user.

11. An information processing equipment as defined in claim 1, wherein said display unit includes:

a display panel which is capable of displaying N colors; and a data conversion circuit which accepts the display information containing up to (N+M) colors, and which produces said display information in the corresponding colors based on the N displayable colors of said display panel and M combinations each consisting of two colors that are selected from among said N colors in order to display a neutral tint through alternate displays thereof at specified timings.

12. An information processing equipment as defined in claim 11, wherein said display unit further includes number-of-colors limitation means for producing the display information in up to said N colors in compliance with the input display information in up to said (N+M) colors in such a way that any of the M neutral tints contained in said input display information is substituted by one of said N colors, thereby limiting said maximum number of colors to-be-developed to N.

13. An information processing equipment as defined in claim 12, wherein said maximum-number-of-colors selection means selects either of said display information in up to said (N+M) colors as delivered from said data conversion circuit or said display information in up to said N colors as delivered from said number-of-colors limitation means, in accordance with the mode selection information delivered from said mode selector.

14. An information processing equipment as defined in claim 13, wherein said maximum-number-of-colors selection means is provided in said display unit.

15. An information processing equipment as defined in claim 11, wherein said maximum-number-of-colors selection means further includes:

number-of-colors limitation means for producing the display information in up to said N colors in compliance with the input display information in up to said (N+M) colors in such a way that any of the M neutral tints contained in said input display information is substituted by one of said N colors, thereby limiting said maximum number of colors to-be-developed to N; and means for producing a command for selecting either of said display information in up to said (N+M) colors as delivered from said data conversion circuit or said display information in up to said N colors as delivered from said number-of-colors limitation means, in accordance with the mode selection information delivered from said mode selector.

16. An information processing equipment as defined in claim 15, wherein said maximum-number-of-colors selection means is provided in said display control circuit.

17. An information processing equipment as defined in claim 15, wherein said display panel is a liquid-crystal display panel.

18. An information processing equipment as defined in claim 11, wherein said display panel is a liquid-crystal display panel.

19. An information processing equipment as defined in claim 1, wherein said display memory includes a first memory and a second memory;

said first memory having a memory capacity which can store, at least, the display information in said number of colors to-be-developed required for the display in said first mode, said second memory having a memory capacity which can store, at least, the display information in said number of colors to-be-developed required for the display in said second mode, when said second memory is used conjointly with said first memory.

20. An information processing equipment as defined in claim 19, further comprising power dissipation control means for controlling power dissipation of said second memory;

said power dissipation control means controlling electric power to said second memory so as to cut off said electric power in said first mode and to supply said electric power in said second mode.

21. An information processing equipment as defined in claim 19, further comprising memory operation control means for controlling the operation of said second memory;

said memory operation control means controlling address information and control information so as to hold said second memory in a standby state in said first mode.

22. A display unit which displays display information in multiple colors within a predetermined number of colors to-be-developed, comprising:

a display panel which is capable of displaying N colors;

a data conversion circuit which accepts the display information containing up to (N+M) colors, and which produces said display information in the corresponding colors based on the N displayable colors of said display panel and M combinations each consisting of two colors that are selected from among said N colors in order to display a neutral tint through alternate displays thereof at specified timings;

number-of-colors limitation means for producing the display information in up to said N colors in compliance with the input display information in up to said (N+M) colors in such a way that any of the M neutral tints contained in said input display information is substituted by one of said N colors, thereby limiting the maximum number of colors to-be-developed to N; and means for producing a command for selecting either of said display information in up to said (N+M) colors as delivered from said data conversion circuit or said display information in up to said N colors as delivered from said number-of-colors limitation means, in accordance with selection information which is input from outside said display unit.

* * * * *

UNITED STATES PATENT AND TRADEMARK OFFICE
CERTIFICATE OF CORRECTION

PATENT NO. : 5,390,293            Page 1 of 2
DATED      : February 14, 1995
INVENTOR(S): Nishioka Kiyokazu, et al It is certified that error appears in the above-indentified patent and that said Letters Patent is hereby corrected as shown below:

| Column | Line | |
|---|---|---|
| 1 | 23 | Change "thede" to --these--. |
| 1 | 49 | Change "frequence" to --frequency--. |
| 2 | 1 | Change "thed" to --the--. |
| 4 | 12 | Change "tthereby" to --thereby--. |
| 5 | 5 | After "period" insert --of--. |
| 5 | 55 | Change "bestowed on" to --realized by--. |
| 12 | 22 | Change "Control" to --control--. |
| 13 | 20 | Change "appoints" to --selects--. |
| 20 | 13 | Change "so-that" to --so that--. |
| 21 | 56 | Change "batter" to --battery--. |
| 22 | 36 | Change "Circuit" to --circuit--. |

UNITED STATES PATENT AND TRADEMARK OFFICE
CERTIFICATE OF CORRECTION

PATENT NO. : 5,390,293
DATED : February 14, 1995
INVENTOR(S) : Nishioka Kiyokazu, et al It is certified that error appears in the above-indentified patent and that said Letters Patent is hereby corrected as shown below:

| Column | Line | |
|--------|------|---|
| 21 | 56 | Change "batter" to --battery--. |
| 22 | 36 | Change "Circuit" to --circuit--. |

Signed and Sealed this

Sixth Day of June, 1995

*Attest:*

BRUCE LEHMAN

*Attesting Officer*  *Commissioner of Patents and Trademarks*